(12) United States Patent
Osborn et al.

(10) Patent No.: US 10,970,374 B2
(45) Date of Patent: Apr. 6, 2021

(54) USER IDENTIFICATION AND AUTHENTICATION WITH NEUROMUSCULAR SIGNATURES

(71) Applicant: Facebook Technologies, LLC, Menlo Park, CA (US)

(72) Inventors: Christopher Osborn, Brooklyn, NY (US); Alexandre Barachant, Brooklyn, NY (US); Daniel Wetmore, Brooklyn, NY (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/442,378

(22) Filed: Jun. 14, 2019

(65) Prior Publication Data

US 2019/0384901 A1     Dec. 19, 2019

Related U.S. Application Data

(60) Provisional application No. 62/685,122, filed on Jun. 14, 2018.

(51) Int. Cl.
*G06F 21/32*     (2013.01)
*G06F 3/01*      (2006.01)
(Continued)

(52) U.S. Cl.
CPC .............. *G06F 21/32* (2013.01); *G06F 3/015* (2013.01); *G06F 3/017* (2013.01); *G06F 9/542* (2013.01);
(Continued)

(58) Field of Classification Search
CPC .......... G06F 21/32; G06F 3/015; G06F 3/017; G06F 9/542; G06N 20/20
See application file for complete search history.

(56) References Cited

U.S. PATENT DOCUMENTS 4,055,168 A    10/1977  Miller et al.
4,896,120 A     1/1990  Kamil
(Continued)

FOREIGN PATENT DOCUMENTS

CA    2902045 A1    8/2014
CA    2921954 A1    2/2015
(Continued)

OTHER PUBLICATIONS

Extended European Search Report for European Application No. EP 17835111.0 dated Nov. 21, 2019.
(Continued)

*Primary Examiner* — Nabil H Syed
(74) *Attorney, Agent, or Firm* — FisherBroyles, LLP

(57) ABSTRACT

Methods and apparatus for authenticating a user based on neuromuscular signals. The method comprises recording, using a plurality of neuromuscular sensors arranged on one or more wearable devices, a plurality of neuromuscular signals from a user; deriving a neuromuscular signature for the user from the plurality of neuromuscular signals and/or information based on the plurality of neuromuscular signals, wherein the neuromuscular signature is indicative of at least one personal characteristic of the user detected in the plurality of neuromuscular signals; and authenticating the user based on the derived neuromuscular signature.

30 Claims, 10 Drawing Sheets

(51) Int. Cl.
  *G06N 20/20* (2019.01)
  *G06N 5/04* (2006.01)
  *G06N 3/08* (2006.01)
  *G06N 3/04* (2006.01)
  *G06F 9/54* (2006.01)

(52) U.S. Cl.
  CPC .......... *G06N 3/0454* (2013.01); *G06N 3/08* (2013.01); *G06N 5/046* (2013.01); *G06N 20/20* (2019.01)

(56) References Cited

U.S. PATENT DOCUMENTS

| | | | |
|---|---|---|---|
| 5,625,577 A | 4/1997 | Kunii et al. | |
| 6,005,548 A | 12/1999 | Latypov et al. | |
| 6,009,210 A | 12/1999 | Kand | |
| 6,244,873 B1 | 6/2001 | Hill et al. | |
| 6,411,843 B1 | 6/2002 | Zarychta | |
| 6,658,287 B1 | 12/2003 | Litt et al. | |
| 6,720,984 B1 | 4/2004 | Jorgensen et al. | |
| 6,774,885 B1 | 8/2004 | Even-Zohar | |
| 6,942,621 B2 | 9/2005 | Avinash et al. | |
| 7,089,148 B1 | 8/2006 | Bachmann et al. | |
| 7,351,975 B2 | 4/2008 | Brady et al. | |
| 7,574,253 B2 | 8/2009 | Edney et al. | |
| 7,580,742 B2 | 8/2009 | Tan et al. | |
| 7,787,946 B2 | 8/2010 | Stahmann et al. | |
| 7,805,386 B2 | 9/2010 | Greer | |
| 7,901,368 B2 | 3/2011 | Flaherty et al. | |
| 8,170,656 B2 | 5/2012 | Tan et al. | |
| 8,190,249 B1 | 5/2012 | Gharieb et al. | |
| 8,311,623 B2 | 11/2012 | Sanger | |
| 8,351,651 B2 | 1/2013 | Lee | |
| 8,421,634 B2 | 4/2013 | Tan et al. | |
| 8,435,191 B2 | 5/2013 | Barboutis et al. | |
| 8,437,844 B2 | 5/2013 | Syed Momen et al. | |
| 8,447,704 B2 | 5/2013 | Tan et al. | |
| 8,484,022 B1 | 7/2013 | Vanhoucke | |
| 8,718,980 B2 | 5/2014 | Garudadri et al. | |
| 8,744,543 B2 | 6/2014 | Li et al. | |
| 8,754,862 B2 | 6/2014 | Zaliva | |
| D717,685 S | 11/2014 | Bailey et al. | |
| 8,880,163 B2 | 11/2014 | Barachant et al. | |
| 8,890,875 B2 | 11/2014 | Jammes et al. | |
| 8,892,479 B2 | 11/2014 | Tan et al. | |
| 9,037,530 B2 | 5/2015 | Tan et al. | |
| D742,272 S | 11/2015 | Bailey et al. | |
| 9,218,574 B2 | 12/2015 | Phillipps et al. | |
| 9,235,934 B2 | 1/2016 | Mandella et al. | |
| 9,240,069 B1 | 1/2016 | Li | |
| 9,278,453 B2 | 3/2016 | Assad | |
| 9,299,248 B2 | 3/2016 | Lake et al. | |
| D756,359 S | 5/2016 | Bailey et al. | |
| 9,351,653 B1 | 5/2016 | Harrison | |
| 9,367,139 B2 | 6/2016 | Ataee et al. | |
| 9,372,535 B2 | 6/2016 | Bailey et al. | |
| 9,389,694 B2 | 7/2016 | Ataee et al. | |
| 9,408,316 B2 | 8/2016 | Bailey et al. | |
| 9,459,697 B2 | 10/2016 | Bedikian et al. | |
| 9,483,123 B2 | 11/2016 | Aleem et al. | |
| 9,597,015 B2 | 3/2017 | McNames et al. | |
| 9,600,030 B2 | 3/2017 | Bailey et al. | |
| 9,612,661 B2 | 4/2017 | Wagner et al. | |
| 9,613,262 B2 | 4/2017 | Holz | |
| 9,654,477 B1 | 5/2017 | Kotamraju | |
| 9,659,403 B1 | 5/2017 | Horowitz | |
| 9,687,168 B2 | 6/2017 | John | |
| 9,696,795 B2 | 7/2017 | Marcolina et al. | |
| 9,720,515 B2 | 8/2017 | Wagner et al. | |
| 9,741,169 B1 | 8/2017 | Holz | |
| 9,766,709 B2 | 9/2017 | Holz | |
| 9,785,247 B1 | 10/2017 | Horowitz et al. | |
| 9,788,789 B2 | 10/2017 | Bailey | |
| 9,864,431 B2 | 1/2018 | Keskin et al. | |
| 9,867,548 B2 | 1/2018 | Le et al. | |
| 9,880,632 B2 | 1/2018 | Ataee et al. | |
| 9,891,718 B2 | 2/2018 | Connor | |
| 10,042,422 B2 | 8/2018 | Morun et al. | |
| 10,070,799 B2 | 9/2018 | Ang et al. | |
| 10,078,435 B2 | 9/2018 | Noel | |
| 10,101,809 B2 | 10/2018 | Morun et al. | |
| 10,152,082 B2 | 12/2018 | Bailey | |
| 10,188,309 B2 | 1/2019 | Morun et al. | |
| 10,199,008 B2 | 2/2019 | Aleem et al. | |
| 10,203,751 B2 | 2/2019 | Keskin et al. | |
| 10,216,274 B2 | 2/2019 | Chapeskie et al. | |
| 10,251,577 B2 | 4/2019 | Morun et al. | |
| 10,310,601 B2 | 6/2019 | Morun et al. | |
| 10,331,210 B2 | 6/2019 | Morun et al. | |
| 10,362,958 B2 | 7/2019 | Morun et al. | |
| 10,409,371 B2 | 9/2019 | Kaifosh et al. | |
| 10,437,335 B2 | 10/2019 | Daniels | |
| 10,460,455 B2 | 10/2019 | Giurgica-Tiron et al. | |
| 10,489,986 B2 | 11/2019 | Kaifosh et al. | |
| 10,496,168 B2 | 12/2019 | Kaifosh et al. | |
| 10,504,286 B2 | 12/2019 | Kaifosh et al. | |
| 2003/0144829 A1 | 7/2003 | Geatz et al. | |
| 2003/0171921 A1 | 9/2003 | Manabe et al. | |
| 2003/0184544 A1 | 10/2003 | Prudent | |
| 2004/0054273 A1 | 3/2004 | Finneran et al. | |
| 2004/0092839 A1 | 5/2004 | Shin et al. | |
| 2006/0129057 A1 | 6/2006 | Maekawa et al. | |
| 2007/0009151 A1 | 1/2007 | Pittman et al. | |
| 2007/0172797 A1 | 7/2007 | Hada et al. | |
| 2007/0177770 A1* | 8/2007 | Derchak | G06K 9/00496 382/115 |
| 2007/0256494 A1 | 11/2007 | Nakamura et al. | |
| 2007/0285399 A1 | 12/2007 | Lund | |
| 2008/0051673 A1 | 2/2008 | Kong et al. | |
| 2008/0052643 A1 | 2/2008 | Ike et al. | |
| 2008/0103639 A1 | 5/2008 | Troy et al. | |
| 2008/0214360 A1 | 9/2008 | Stirling et al. | |
| 2008/0221487 A1 | 9/2008 | Zohar et al. | |
| 2009/0027337 A1 | 1/2009 | Hildreth | |
| 2009/0079813 A1 | 3/2009 | Hildreth | |
| 2009/0082692 A1 | 3/2009 | Hale et al. | |
| 2009/0082701 A1 | 3/2009 | Zohar et al. | |
| 2009/0112080 A1 | 4/2009 | Matthews | |
| 2009/0124881 A1 | 5/2009 | Rytky | |
| 2009/0326406 A1 | 12/2009 | Tan et al. | |
| 2009/0327171 A1 | 12/2009 | Tan et al. | |
| 2010/0030532 A1 | 2/2010 | Arora et al. | |
| 2010/0063794 A1 | 3/2010 | Hernandez-Rebollar | |
| 2010/0106044 A1 | 4/2010 | Linderman | |
| 2010/0113910 A1 | 5/2010 | Brauers et al. | |
| 2010/0280628 A1 | 11/2010 | Sankai | |
| 2010/0292595 A1 | 11/2010 | Paul | |
| 2010/0292606 A1 | 11/2010 | Prakash et al. | |
| 2010/0292617 A1 | 11/2010 | Lei et al. | |
| 2010/0293115 A1 | 11/2010 | Seyed Momen | |
| 2010/0315266 A1 | 12/2010 | Gunawardana et al. | |
| 2011/0077484 A1 | 3/2011 | Van Slyke et al. | |
| 2011/0092826 A1 | 4/2011 | Lee et al. | |
| 2011/0173204 A1 | 7/2011 | Murillo et al. | |
| 2011/0173574 A1 | 7/2011 | Clavin et al. | |
| 2011/0230782 A1 | 9/2011 | Bartol et al. | |
| 2012/0066163 A1 | 3/2012 | Balls et al. | |
| 2012/0188158 A1 | 7/2012 | Tan et al. | |
| 2012/0265480 A1 | 10/2012 | Oshima | |
| 2012/0283526 A1 | 11/2012 | Gommesen et al. | |
| 2013/0004033 A1 | 1/2013 | Trugenberger | |
| 2013/0077820 A1 | 3/2013 | Marais et al. | |
| 2013/0123656 A1 | 5/2013 | Heck | |
| 2013/0141375 A1 | 6/2013 | Ludwig et al. | |
| 2013/0207889 A1 | 8/2013 | Chang et al. | |
| 2013/0217998 A1 | 8/2013 | Mahfouz et al. | |
| 2013/0232095 A1* | 9/2013 | Tan | G06N 20/00 706/12 |
| 2013/0317382 A1 | 11/2013 | Le | |
| 2013/0317648 A1 | 11/2013 | Assad | |
| 2014/0052150 A1 | 2/2014 | Taylor et al. | |
| 2014/0092009 A1 | 4/2014 | Yen et al. | |
| 2014/0098018 A1 | 4/2014 | Kim et al. | |
| 2014/0196131 A1 | 7/2014 | Lee | |

(56) References Cited

U.S. PATENT DOCUMENTS

| | | |
|---|---|---|
| 2014/0198034 A1 | 7/2014 | Bailey et al. |
| 2014/0198035 A1 | 7/2014 | Bailey et al. |
| 2014/0223462 A1 | 8/2014 | Aimone et al. |
| 2014/0240103 A1 | 8/2014 | Lake et al. |
| 2014/0240223 A1 | 8/2014 | Lake et al. |
| 2014/0245200 A1 | 8/2014 | Holz |
| 2014/0249397 A1 | 9/2014 | Lake et al. |
| 2014/0277622 A1 | 9/2014 | Raniere |
| 2014/0278441 A1 | 9/2014 | Ton et al. |
| 2014/0297528 A1* | 10/2014 | Agrawal .......... G06Q 20/40145 705/44 |
| 2014/0304665 A1 | 10/2014 | Holz |
| 2014/0330404 A1 | 11/2014 | Abdelghani et al. |
| 2014/0334083 A1 | 11/2014 | Bailey |
| 2014/0344731 A1 | 11/2014 | Holz |
| 2014/0355825 A1 | 12/2014 | Kim et al. |
| 2014/0358024 A1 | 12/2014 | Nelson et al. |
| 2014/0361988 A1 | 12/2014 | Katz et al. |
| 2014/0364703 A1 | 12/2014 | Kim et al. |
| 2014/0365163 A1 | 12/2014 | Jallon |
| 2014/0376773 A1 | 12/2014 | Holz |
| 2015/0006120 A1 | 1/2015 | Sett et al. |
| 2015/0010203 A1 | 1/2015 | Muninder et al. |
| 2015/0025355 A1 | 1/2015 | Bailey et al. |
| 2015/0029092 A1 | 1/2015 | Holz et al. |
| 2015/0035827 A1 | 2/2015 | Yamaoka et al. |
| 2015/0045689 A1 | 2/2015 | Barone |
| 2015/0045699 A1 | 2/2015 | Mokaya et al. |
| 2015/0051470 A1 | 2/2015 | Bailey et al. |
| 2015/0057770 A1 | 2/2015 | Bailey et al. |
| 2015/0070270 A1 | 3/2015 | Bailey et al. |
| 2015/0070274 A1 | 3/2015 | Morozov |
| 2015/0084860 A1 | 3/2015 | Aleem et al. |
| 2015/0109202 A1 | 4/2015 | Ataee et al. |
| 2015/0124566 A1 | 5/2015 | Lake et al. |
| 2015/0128094 A1 | 5/2015 | Baldwin et al. |
| 2015/0141784 A1 | 5/2015 | Morun et al. |
| 2015/0148641 A1 | 5/2015 | Morun et al. |
| 2015/0157944 A1 | 6/2015 | Gottlieb |
| 2015/0169074 A1 | 6/2015 | Ataee et al. |
| 2015/0182165 A1 | 7/2015 | Miller et al. |
| 2015/0193949 A1 | 7/2015 | Katz et al. |
| 2015/0223716 A1 | 8/2015 | Korkala et al. |
| 2015/0234426 A1 | 8/2015 | Bailey et al. |
| 2015/0261306 A1 | 9/2015 | Lake |
| 2015/0261318 A1 | 9/2015 | Scavezze et al. |
| 2015/0277575 A1 | 10/2015 | Ataee et al. |
| 2015/0296553 A1 | 10/2015 | DiFranco et al. |
| 2015/0302168 A1 | 10/2015 | De Sapio et al. |
| 2015/0309563 A1 | 10/2015 | Connor |
| 2015/0309582 A1 | 10/2015 | Gupta |
| 2015/0313496 A1 | 11/2015 | Connor |
| 2015/0325202 A1 | 11/2015 | Lake et al. |
| 2015/0332013 A1 | 11/2015 | Lee et al. |
| 2015/0346701 A1 | 12/2015 | Gordon et al. |
| 2015/0366504 A1 | 12/2015 | Connor |
| 2015/0370326 A1 | 12/2015 | Chapeskie et al. |
| 2015/0370333 A1 | 12/2015 | Ataee et al. |
| 2016/0011668 A1 | 1/2016 | Gilad-Bachrach et al. |
| 2016/0049073 A1 | 2/2016 | Lee |
| 2016/0092504 A1 | 3/2016 | Mitri et al. |
| 2016/0144172 A1 | 5/2016 | Hsueh et al. |
| 2016/0162604 A1 | 6/2016 | Xiaoli et al. |
| 2016/0187992 A1 | 6/2016 | Yamamoto et al. |
| 2016/0235323 A1 | 8/2016 | Tadi et al. |
| 2016/0239080 A1 | 8/2016 | Marcolina et al. |
| 2016/0262687 A1 | 9/2016 | Vaidyanathan et al. |
| 2016/0267265 A1* | 9/2016 | Waltermann ............ G06F 21/32 |
| 2016/0274758 A1 | 9/2016 | Bailey |
| 2016/0275726 A1 | 9/2016 | Mullins |
| 2016/0292497 A1 | 10/2016 | Kehtarnavaz et al. |
| 2016/0313798 A1 | 10/2016 | Connor |
| 2016/0313801 A1 | 10/2016 | Wagner et al. |
| 2016/0313890 A1 | 10/2016 | Walline et al. |
| 2016/0313899 A1 | 10/2016 | Noel |
| 2016/0350973 A1 | 12/2016 | Shapira et al. |
| 2017/0031502 A1 | 2/2017 | Rosenberg et al. |
| 2017/0035313 A1 | 2/2017 | Hong et al. |
| 2017/0061817 A1 | 3/2017 | Mettler May |
| 2017/0068445 A1 | 3/2017 | Lee et al. |
| 2017/0080346 A1 | 3/2017 | Abbas |
| 2017/0090604 A1 | 3/2017 | Barbier |
| 2017/0091567 A1* | 3/2017 | Wang ................. A61B 5/02028 |
| 2017/0119472 A1 | 5/2017 | Herrmann et al. |
| 2017/0123487 A1 | 5/2017 | Hazra et al. |
| 2017/0124816 A1 | 5/2017 | Yang et al. |
| 2017/0161635 A1 | 6/2017 | Oono et al. |
| 2017/0188980 A1 | 7/2017 | Ash |
| 2017/0259167 A1 | 9/2017 | Cook et al. |
| 2017/0285756 A1 | 10/2017 | Wang et al. |
| 2017/0285848 A1 | 10/2017 | Rosenberg et al. |
| 2017/0296363 A1 | 10/2017 | Yetkin et al. |
| 2017/0301630 A1 | 10/2017 | Nguyen et al. |
| 2017/0308118 A1 | 10/2017 | Ito |
| 2017/0344706 A1 | 11/2017 | Tones et al. |
| 2017/0347908 A1 | 12/2017 | Watanabe et al. |
| 2018/0000367 A1* | 1/2018 | Longinotti-Buitoni ..................... A41D 13/1281 |
| 2018/0020951 A1 | 1/2018 | Kaifosh et al. |
| 2018/0020978 A1 | 1/2018 | Kaifosh et al. |
| 2018/0024634 A1 | 1/2018 | Kaifosh et al. |
| 2018/0024635 A1 | 1/2018 | Kaifosh et al. |
| 2018/0064363 A1 | 3/2018 | Morun et al. |
| 2018/0067553 A1 | 3/2018 | Morun et al. |
| 2018/0081439 A1 | 3/2018 | Daniels |
| 2018/0088765 A1 | 3/2018 | Bailey |
| 2018/0092599 A1 | 4/2018 | Kerth et al. |
| 2018/0095630 A1 | 4/2018 | Bailey |
| 2018/0101235 A1 | 4/2018 | Bodensteiner et al. |
| 2018/0101289 A1 | 4/2018 | Bailey |
| 2018/0120948 A1 | 5/2018 | Aleem et al. |
| 2018/0140441 A1 | 5/2018 | Poirters |
| 2018/0150033 A1 | 5/2018 | Lake et al. |
| 2018/0153430 A1 | 6/2018 | Ang et al. |
| 2018/0153444 A1 | 6/2018 | Yang et al. |
| 2018/0154140 A1 | 6/2018 | Bouton et al. |
| 2018/0178008 A1 | 6/2018 | Bouton et al. |
| 2018/0235494 A1* | 8/2018 | Kosierkiewicz ...... A61B 5/0492 |
| 2018/0301057 A1* | 10/2018 | Hargrove ............. G06T 19/003 |
| 2018/0307314 A1 | 10/2018 | Connor |
| 2018/0321745 A1 | 11/2018 | Morun et al. |
| 2018/0321746 A1 | 11/2018 | Morun et al. |
| 2018/0333575 A1 | 11/2018 | Bouton |
| 2018/0338720 A1* | 11/2018 | Gupta ...................... G09G 5/34 |
| 2018/0344195 A1 | 12/2018 | Morun et al. |
| 2018/0360379 A1 | 12/2018 | Harrison et al. |
| 2019/0008453 A1 | 1/2019 | Spoof |
| 2019/0025919 A1 | 1/2019 | Tadi et al. |
| 2019/0033967 A1 | 1/2019 | Morun et al. |
| 2019/0033974 A1 | 1/2019 | Mu et al. |
| 2019/0038166 A1 | 2/2019 | Tavabi et al. |
| 2019/0076716 A1 | 3/2019 | Chiou et al. |
| 2019/0121305 A1 | 4/2019 | Kaifosh et al. |
| 2019/0121306 A1 | 4/2019 | Kaifosh et al. |
| 2019/0146809 A1 | 5/2019 | Lee et al. |
| 2019/0150777 A1 | 5/2019 | Guo et al. |
| 2019/0192037 A1 | 6/2019 | Morun et al. |
| 2019/0212817 A1 | 7/2019 | Kaifosh et al. |
| 2019/0223748 A1 | 7/2019 | Al-natsheh et al. |
| 2019/0227627 A1 | 7/2019 | Kaifosh et al. |
| 2019/0228330 A1 | 7/2019 | Kaifosh et al. |
| 2019/0228533 A1 | 7/2019 | Giurgica-Tiron et al. |
| 2019/0228579 A1 | 7/2019 | Kaifosh et al. |
| 2019/0228590 A1 | 7/2019 | Kaifosh et al. |
| 2019/0228591 A1 | 7/2019 | Giurgica-Tiron et al. |
| 2019/0247650 A1 | 8/2019 | Tran |
| 2019/0324549 A1 | 10/2019 | Araki et al. |
| 2019/0357787 A1 | 11/2019 | Barachant et al. |

(56) References Cited

U.S. PATENT DOCUMENTS

| | | | |
|---|---|---|---|
| 2019/0362557 A1 | 11/2019 | Lacey et al. | |
| 2020/0065569 A1* | 2/2020 | Nduka | G06K 9/209 |

FOREIGN PATENT DOCUMENTS

| | | | |
|---|---|---|---|
| CA | 2939644 A1 | 8/2015 | |
| CN | 1838933 A | 9/2006 | |
| CN | 103777752 A | 5/2014 | |
| CN | 105190578 A | 12/2015 | |
| CN | 106102504 A | 11/2016 | |
| EP | 2198521 B1 | 6/2012 | |
| EP | 2959394 A1 | 12/2015 | |
| EP | 3104737 A1 | 12/2016 | |
| JP | H05-277080 A | 10/1993 | |
| JP | 2005-095561 A | 4/2005 | |
| JP | 2010-520561 A | 6/2010 | |
| JP | 2016-507851 A | 3/2016 | |
| JP | 2017-509386 A | 4/2017 | |
| KR | 2015-0123254 A | 11/2015 | |
| KR | 2016-0121552 A | 10/2016 | |
| KR | 10-1790147 B1 | 10/2017 | |
| WO | WO 2008/109248 A2 | 9/2008 | |
| WO | WO 2009/042313 A1 | 4/2009 | |
| WO | WO 2010/104879 A2 | 9/2010 | |
| WO | WO 2012/155157 A1 | 11/2012 | |
| WO | WO 2014/130871 A1 | 8/2014 | |
| WO | WO 2014/186370 A1 | 11/2014 | |
| WO | WO 2014/194257 A1 | 12/2014 | |
| WO | WO 2014/197443 A1 | 12/2014 | |
| WO | WO 2015/027089 A1 | 2/2015 | |
| WO | WO 2015/073713 A1 | 5/2015 | |
| WO | WO 2015/081113 A1 | 6/2015 | |
| WO | WO 2015/123445 A1 | 8/2015 | |
| WO | WO 2015/199747 A1 | 12/2015 | |
| WO | WO 2016/041088 A1 | 3/2016 | |
| WO | WO 2017/062544 A1 | 4/2017 | |
| WO | WO 2017/092225 A1 | 6/2017 | |
| WO | WO 2017/120669 A1 | 7/2017 | |
| WO | WO 2017/172185 A1 | 10/2017 | |
| WO | WO 2017/208167 A1 | 12/2017 | |

OTHER PUBLICATIONS

Extended European Search Report for European Application No. EP 17835140.9 dated Nov. 26, 2019.
International Search Report and Written Opinion for International Application No. PCT/US2019/037302 dated Oct. 11, 2019.
International Search Report and Written Opinion for International Application No. PCT/US2019/034173 dated Sep. 18, 2019.
International Search Report and Written Opinion for International Application No. PCT/US2019/042579 dated Oct. 31, 2019.
Invitation to Pay Additional Fees for International Application No. PCT/US2019/049094 dated Oct. 24, 2019.
International Search Report and Written Opinion for International Application No. PCT/US2019/052131 dated Dec. 6, 2019.
International Search Report and Written Opinion for International Application No. PCT/US2019/046351 dated Nov. 7, 2019.
Al-Mashhadany, Inverse Kinematics Problem (IKP) of 6-DOF Manipulator Bgy Locally Recurrent Neural Networks (LRNNs). Management and Service Science (MASS). 2010 International Conference ON, IEEE. Aug. 24, 2010. 5 pages. ISBN: 978-1-4244-5325-2.
Kipke et al., Silicon-substrate Intracortical Microelectrode Arrays for Long-Term Recording of Neuronal Spike Activity in Cerebral Cortex. IEEE Transactions on Neural Systems and Rehabilitation Engineering. 2003;11(2):151-155.
Marcard et al., Sparse Inertial Poser: Automatic 3D Human Pose Estimation from Sparse IMUs. Eurographics. 2017;36(2). 12 pages.
Mohamed, Homogeneous cognitive based biometrics for static authentication. Dissertation submitted to University of Victoria, Canada. 2010. 149 pages. URL:http://hdl.handle.net/1828/3211 [last accessed Oct. 11, 2019].

Wittevrongel et al., Spatiotemporal Beamforming: A Transparent and Unified Decoding Approach to Synchronous Visual Brain-Computer Interfacing. Frontiers in Neuroscience. 2017;11:1-12.
Zacharaki et al., Spike pattern recognition by supervised classification in low dimensional embedding space. Brain Informatics. 2016;3:73-8. DOI: 10.1007/s40708-016-0044-4.
International Preliminary Report on Patentability for International Application No. PCT/US2017/043686 dated Feb. 7, 2019.
International Preliminary Report on Patentability for International Application No. PCT/US2017/043693 dated Feb. 7, 2019.
International Preliminary Report on Patentability for International Application No. PCT/US2017/043791 dated Feb. 7, 2019.
International Preliminary Report on Patentability for International Application No. PCT/US2017/043792 dated Feb. 7, 2019.
International Search Report and Written Opinion for International Application No. PCT/US2017/043686 dated Oct. 6, 2017.
International Search Report and Written Opinion for International Application No. PCT/US2017/043693 dated Oct. 6, 2017.
International Search Report and Written Opinion for International Application No. PCT/US2017/043791 dated Oct. 5, 2017.
International Search Report and Written Opinion for International Application No. PCT/US2017/043792 dated Oct. 5, 2017.
International Search Report and Written Opinion for International Application No. PCT/US2018/056768 dated Jan. 15, 2019.
International Search Report and Written Opinion for International Application No. PCT/US2018/061409 dated Mar. 12, 2019.
International Search Report and Written Opinion for International Application No. PCT/US2018/063215 dated Mar. 21, 2019.
International Search Report and Written Opinion for International Application No. PCT/US2019/015134 dated May 15, 2019.
International Search Report and Written Opinion for International Application No. PCT/US2019/015167 dated May 21, 2019.
International Search Report and Written Opinion for International Application No. PCT/US2019/015174 dated May 21, 2019.
International Search Report and Written Opinion for International Application No. PCT/US2019/015238 dated May 16, 2019.
International Search Report and Written Opinion for International Application No. PCT/US2019/015183 dated May 3, 2019.
International Search Report and Written Opinion for International Application No. PCT/US2019/015180 dated May 28, 2019.
International Search Report and Written Opinion for International Application No. PCT/US2019/015244 dated May 16, 2019.
International Search Report and Written Opinion for International Application No. PCT/US2019/028299 dated Aug. 9, 2019.
Invitation to Pay Additional Fees for International Application No. PCT/US2019/031114 dated Aug. 6, 2019.
International Search Report and Written Opinion for International Application No. PCT/US19/20065 dated May 16, 2019.
Arkenbout et al., Robust Hand Motion Tracking through Data Fusion of 5DT Data Glove and Nimble VR Kinect Camera Measurements. Sensors. 2015;15:31644-71.
Benko et al., Enhancing Input On and Above the Interactive Surface with Muscle Sensing. The ACM International Conference on Interactive Tabletops and Surfaces. ITS '09. 2009:93-100.
Boyali et al., Spectral Collaborative Representation based Classification for hand gestures recognition on electromyography signals. Biomedical Signal Processing and Control. 2016;24:11-18.
Cheng et al., A Novel Phonology- and Radical-Coded Chinese Sign Language Recognition Framework Using Accelerometer and Surface Electromyography Sensors. Sensors. 2015;15:23303-24.
Csapo et al., Evaluation of Human-Myo Gesture Control Capabilities in Continuous Search and Select Operations. 7th IEEE International Conference on Cognitive Infocommunications. 2016;000415-20.
Davoodi et al., Development of a Physics-Based Target Shooting Game to Train Amputee Users of Multijoint Upper Limb Prostheses. Presence. Massachusetts Institute of Technology. 2012;21(1):85-95.
Delis et al., Development of a Myoelectric Controller Based on Knee Angle Estimation. Biodevices 2009. International Conference on Biomedical Electronics and Devices. Jan. 17, 2009. 7 pages.
Diener et al., Direct conversion from facial myoelectric signals to speech using Deep Neural Networks. 2015 International Joint Conference on Neural Networks (IJCNN). Oct. 1, 2015. 7 pages.

(56) References Cited

OTHER PUBLICATIONS

Ding et al., HMM with improved feature extraction-based feature parameters for identity recognition of gesture command operators by using a sensed Kinect-data stream. Neurocomputing. 2017;262:108-19.
Farina et al., Man/machine interface based on the discharge timings of spinal motor neurons after targeted muscle reinnervation. Nature. Biomedical Engineering. 2017;1:1-12.
Favorskaya et al., Localization and Recognition of Dynamic Hand Gestures Based on Hierarchy of Manifold Classifiers. International Archives of the Photogrammetry, Remote Sensing and Spatial Information Sciences. 2015;XL-5/W6:1-8.
Gallina et al., Surface EMG Biofeedback. Surface Electromyography: Physiology, Engineering, and Applications. 2016:485-500.
Gopura et al., A Human Forearm and wrist motion assist exoskeleton robot with EMG-based fuzzy-neuro control. Proceedings of the 2nd IEEE/RAS-EMBS International Conference on Biomedical Robotics and Biomechatronics. Oct. 19-22, 2008. 6 pages.
Hauschild et al., A Virtual Reality Environment for Designing and Fitting Neural Prosthetic Limbs. IEEE Transactions on Neural Systems and Rehabilitation Engineering. 2007;15(1):9-15.
Jiang, Purdue University Graduate School Thesis/Dissertation Acceptance. Graduate School Form 30. Updated Jan. 15, 2015. 24 pages.
Kawaguchi et al., Estimation of Finger Joint Angles Based on Electromechanical Sensing of Wrist Shape. IEEE Transactions on Neural Systems and Rehabilitation Engineering. 2017;25(9):1409-18.
Kim et al., Real-Time Human Pose Estimation and Gesture Recognition from Depth Images Using Superpixels and SVM Classifier. Sensors. 2015;15:12410-27.
Koerner, Design and Characterization of the Exo-Skin Haptic Device: A Novel Tendon Actuated Textile Hand Exoskeleton. 2017. 5 pages.
Lee et al., Motion and Force Estimation System of Human Fingers. Journal of Institute of Control, Robotics and Systems. 2011;17(10):1014-1020.
Li et al., Motor Function Evaluation of Hemiplegic Upper-Extremities Using Data Fusion from Wearable Inertial and Surface EMG Sensors. Sensors. MDPI. 2017;17(582):1-17.
Lopes et al., Hand/arm gesture segmentation by motion using IMU and EMG sensing. ScienceDirect. Elsevier. Procedia Manufacturing. 2017;11:107-13.
Martin et al., A Novel Approach of Prosthetic Arm Control using Computer Vision, Biosignals, and Motion Capture. IEEE. 2014. 5 pages.
McIntee, A Task Model of Free-Space Movement-Based Gestures. Dissertation. Graduate Faculty of North Carolina State University. Computer Science. 2016. 129 pages.
Mendes et al., Sensor Fusion and Smart Sensor in Sports and Biomedical Applications. Sensors. 2016;16(1569):1-31.
Naik et al., Source Separation and Identification issues in bio signals: A solution using Blind source separation. Intech. 2009. 23 pages.
Naik et al., Subtle Hand gesture identification for HCI using Temporal Decorrelation Source Separation BSS of surface EMG. Digital Image Computing Techniques and Applications. IEEE Computer Society. 2007;30-7.
Negro et al., Multi-channel intramuscular and surface EMG decomposition by convolutive blind source separation. Journal of Neural Engineering. 2016;13:1-17.
Saponas et al., Demonstrating the Feasibility of Using Forearm Electromyography for Muscle-Computer Interfaces. CHI 2008 Proceedings. Physiological Sensing for Input. 2008:515-24.
Saponas et al., Enabling Always-Available Input with Muscle-Computer Interfaces. UIST '09. 2009:167-76.
Saponas et al., Making Muscle-Computer Interfaces More Practical. CHI 2010: Brauns and Brawn. 2010:851-4.
Sartori et al., Neural Data-Driven Musculoskeletal Modeling for Personalized Neurorehabilitation Technologies. IEEE Transactions on Biomedical Engineering. 2016;63(5):879-93.
Sauras-Perez et al., A Voice and Pointing Gesture Interaction System for Supporting Human Spontaneous Decisions in Autonomous Cars. Clemson University. All Dissertations. 2017. 174 pages.
Shen et al., I am a Smartwatch and I can Track my User's Arm. University of Illinois at Urbana-Champaign. MobiSys' 16. 12 pages.
Son et al., Evaluating the utility of two gestural discomfort evaluation methods. PLOS One. 2017. 21 pages.
Strbac et al., Microsoft Kinect-Based Artificial Perception System for Control of Functional Electrical Stimulation Assisted Grasping. Hindawi Publishing Corporation. BioMed Research International. 2014. 13 pages.
Torres, Myo Gesture Control Armband. PCMag. Https://www.pcmag.com/article2/0,2817,2485462,00.asp 2015. 9 pages.
Valero-Cuevas et al., Computational Models for Neuromuscular Function. NIH Public Access Author Manuscript. Jun. 16, 2011. 52 pages.
Wodzinski et al., Sequential Classification of Palm Gestures Based on A* Algorithm and MLP Neural Network for Quadrocopter Control. Metrol. Meas. Syst., 2017;24(2):265-76.
Xue et al., Multiple Sensors Based Hand Motion Recognition Using Adaptive Directed Acyclic Graph. Applied Sciences. MDPI. 2017;7(358):1-14.
Yang et al., Surface EMG based handgrip force predictions using gene expression programming. Neurocomputing. 2016;207:568-579.

\* cited by examiner

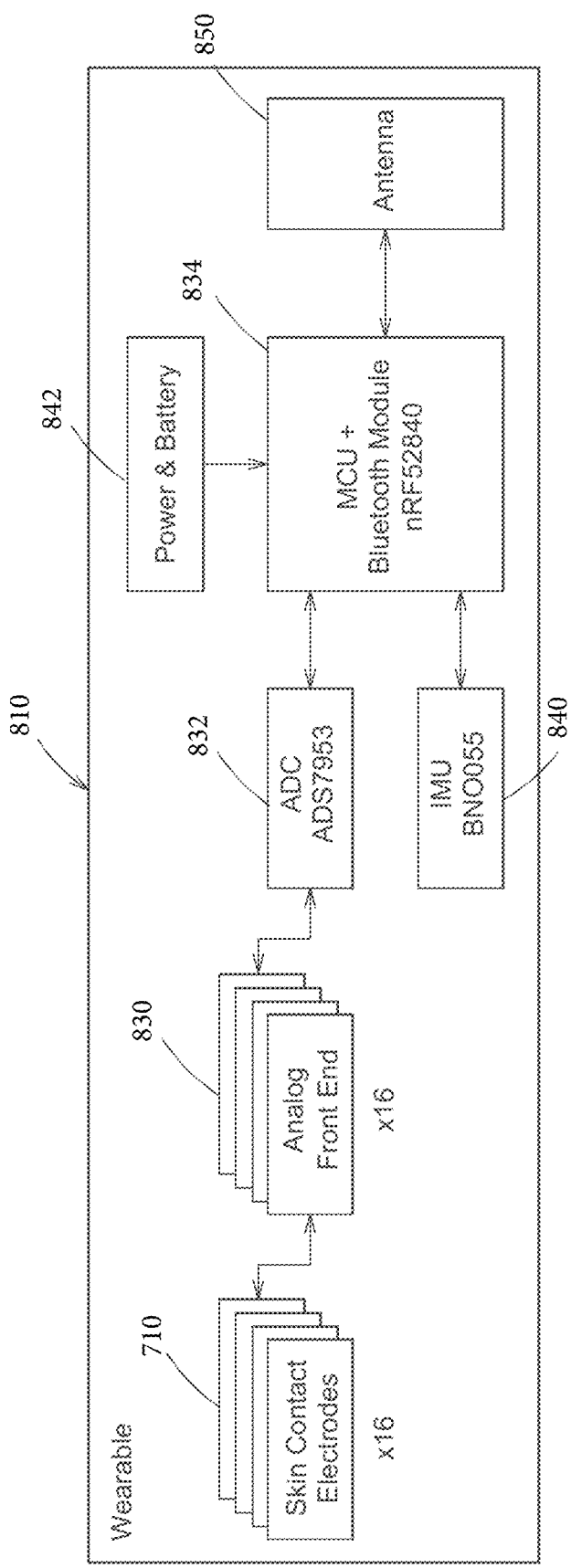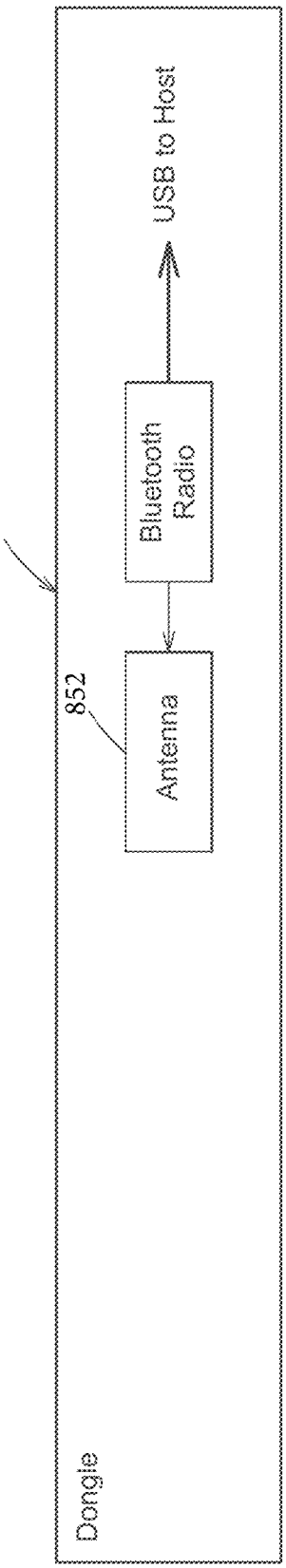
FIG. 8A
FIG. 8B

USER IDENTIFICATION AND AUTHENTICATION WITH NEUROMUSCULAR SIGNATURES

RELATED APPLICATIONS

This application claims priority under 35 U.S.C. § 119(e) to U.S. Provisional Application No. 62/685,122, filed Jun. 14, 2018, and titled, "USER IDENTIFICATION AND AUTHENTICATION WITH NEUROMUSCULAR SIGNATURES," the entire contents of which is incorporated by reference herein.

BACKGROUND

Many techniques exist for authentication and/or identification of users. Typically, when a user desires access to a resource, for example, a network resource, a user is prompted to provide a user name and password, which is used to determine whether the user is authorized to access the resource. Biometric techniques, such as iris recognition techniques, fingerprint recognition techniques, and/or other forms of biometric techniques have also been used for purposes of authenticating/identifying users.

SUMMARY

Some embodiments are directed to a computerized system for authenticating a user based on neuromuscular signals. The system comprises a plurality of neuromuscular sensors configured to record a first plurality of neuromuscular signals from a user, wherein the plurality of neuromuscular sensors are arranged on one or more wearable devices. The system comprises at least one computer processor programmed to: determine an identifier for the user; identify, based on the identifier, an inference model to be used for user authentication, wherein the inference model is associated with a neuromuscular signature indicative of at least one personal characteristic of the user; provide as input to the inference model, the first plurality of neuromuscular signals and/or information based on the first plurality of neuromuscular signals; and authenticate the user based, at least in part, on an output of the inference model.

In one aspect, determining the identifier for the user comprises determining the identifier based on user input provided by the user.

In another aspect, the user input comprises one or more of textual input, voice input, or biometric input.

In another aspect, determining the identifier for the user comprises determining the identifier based, at least in part, on the first plurality of neuromuscular signals.

In another aspect, determining the identifier based, at least in part, on the first plurality of neuromuscular signals comprises: providing as input to a plurality of inference models, the first plurality of neuromuscular signals, wherein each of the plurality of inference models is associated with a different user; and determining the user identifier based on an output of each of the plurality of inference models.

In another aspect, the at least one personal characteristic of the user comprises at least one pattern of muscle activity or motor unit activation detected in the first plurality of neuromuscular signals and/or the information based on the first plurality of neuromuscular signals.

In another aspect, authenticating the user comprises determining whether the first plurality of neuromuscular signals and/or information based on the first plurality of neuromuscular signals provided as input to the inference model belong to the user associated with identifier.

In another aspect, identifying an inference model to be used for user authentication based on the identifier comprises identifying the inference model based on an indication of the inference model stored in a profile associated with the user.

In another aspect, identifying an inference model to be used for user authentication based on the identifier comprises: determining whether the inference model exists or has been previously trained for the user; and in response to determining that the inference model exists or has been previously trained for the user, identifying the inference model as the inference model to use for authenticating the user.

In another aspect, identifying an inference model to be used for user authentication based on the identifier comprises: in response to determining that the inference model exists or has been previously trained for the user, determining whether the user has been successfully authenticated using the inference model; and in response to determining that the user has not been successfully authenticated using the inference model: prompting the user to perform a movement to provide a second plurality of neuromuscular signals; and training the inference model using the second plurality of neuromuscular signals.

In another aspect, identifying an inference model to be used for user authentication based on the identifier comprises: in response to determining that the inference model does not exist or has been not been previously trained for the user: prompting the user to perform a movement to provide a second plurality of neuromuscular signals; and training the inference model using the second plurality of neuromuscular signals.

Some embodiments are directed to a computerized system for training an inference model to authenticate a user based on neuromuscular signals. The system comprises a plurality of neuromuscular sensors configured to record a plurality of neuromuscular signals from a user, wherein the plurality of neuromuscular sensors are arranged on one or more wearable devices. The system comprises at least one computer processor programmed to: train an inference model for authenticating the user, wherein training the inference model comprises: providing as input to the inference model, the plurality of neuromuscular signals recorded from the user and a plurality of neuromuscular signals recorded from a plurality of users other than the user; training the inference model to classify the plurality of neuromuscular signals recorded from the user as belonging to the user and to classify the plurality of neuromuscular signals recorded from the plurality of users other than the user as not belonging to the user, wherein the trained inference model is associated with a neuromuscular signature for the user indicative of at least one personal characteristic of the user; and storing the trained inference model and/or information associated with the neuromuscular signature for the user to use in authenticating the user.

In one aspect, the neuromuscular signature comprises a covariance matrix derived from the first plurality of neuromuscular signals.

In another aspect, the neuromuscular signature comprises spectral information derived from the first plurality of neuromuscular signals.

In another aspect, the inference model is implemented as a neural network, and wherein the neuromuscular signature comprises weights for the neural network.

Some embodiments are directed to a method for authenticating a user based on neuromuscular signals. The method comprises: recording, using a plurality of neuromuscular sensors arranged on one or more wearable devices, a first plurality of neuromuscular signals from a user; determining an identifier for the user; identifying an inference model to be used for user authentication based on the identifier, wherein the inference model is associated with a neuromuscular signature indicative of at least one personal characteristic of the user; providing as input to the inference model, the first plurality of neuromuscular signals and/or information based on the first plurality of neuromuscular signals; and authenticating the user based, at least in part, on an output of the inference model.

In one aspect, determining the identifier for the user comprises determining the identifier based on user input provided by the user.

In another aspect, the user input comprises one or more of textual input, voice input, or biometric input.

In another aspect, determining the identifier for the user comprises determining the identifier based, at least in part, on the first plurality of neuromuscular signals.

In another aspect, determining the identifier based on the first plurality of neuromuscular signals comprises: providing as input to a plurality of inference models, the first plurality of neuromuscular signals, wherein each of the plurality of inference models is associated with a different user; and determining the user identifier based on an output of each of the plurality of inference models.

In another aspect, the at least one personal characteristic of the user comprises at least one pattern of muscle activity or motor unit activation detected in the first plurality of neuromuscular signals and/or the information based on the first plurality of neuromuscular signals.

In another aspect, authenticating the user comprises: determining whether the first plurality of neuromuscular signals and/or information based on the first plurality of neuromuscular signals provided as input to the inference model belong to the user associated with identifier.

In another aspect, identifying an inference model to be used for user authentication based on the identifier comprises: identifying the inference model based on an indication of the inference model stored in a profile associated with the user.

In another aspect, identifying an inference model to be used for user authentication based on the identifier comprises: determining whether the inference model exists or has been previously trained for the user; and in response to determining that the inference model exists or has been previously trained for the user, identifying the inference model as the inference model to use for authenticating the user.

In another aspect, identifying an inference model to be used for user authentication based on the identifier comprises: in response to determining that the inference model exists or has been previously trained for the user, determining whether the user has been successfully authenticated using the inference model; and in response to determining that the user has not been successfully authenticated using the inference model: prompting the user to perform a movement to provide a second plurality of neuromuscular signals; and training the inference model using the second plurality of neuromuscular signals.

In another aspect, identifying an inference model to be used for user authentication based on the identifier comprises: in response to determining that the inference model does not exist or has been not been previously trained for the user: prompting the user to perform a movement to provide a second plurality of neuromuscular signals; and training the inference model using the second plurality of neuromuscular signals.

Some embodiments are directed to a method for training an inference model to authenticate a user based on neuromuscular signals. The method comprises: recording, using a plurality of neuromuscular sensors arranged on one or more wearable devices, a plurality of neuromuscular signals from a user; training an inference model to be used to authenticate the user, wherein training the inference model comprises: providing as input to the inference model, the plurality of neuromuscular signals recorded from the user and a plurality of neuromuscular signals recorded from a plurality of users other than the user; training the inference model to classify the plurality of neuromuscular signals recorded from the user as belonging to the user and to classify the plurality of neuromuscular signals recorded from the plurality of users other than the user as not belonging to the user, wherein the trained inference model is associated with a neuromuscular signature for the user indicative of at least one personal characteristic of the user; and storing the trained inference model and/or information associated with the neuromuscular signature for the user to use in authenticating the user.

In one aspect, the neuromuscular signature comprises a covariance matrix derived from the first plurality of neuromuscular signals.

In another aspect, the neuromuscular signature comprises spectral information derived from the first plurality of neuromuscular signals.

In another aspect, the inference model is implemented as a neural network, and wherein the neuromuscular signature comprises weights for the neural network.

Some embodiments are directed to a computerized system for identifying a user based on neuromuscular signals. The system comprises a plurality of neuromuscular sensors configured to record a plurality of neuromuscular signals from a user, wherein the plurality of neuromuscular sensors are arranged on one or more wearable devices. The system further comprises at least one computer processor programmed to derive a neuromuscular signature for the user from the plurality of neuromuscular signals and/or information based on the plurality of neuromuscular signals, wherein the neuromuscular signature is indicative of at least one personal characteristic of the user detected in the plurality of neuromuscular signals; and identify the user based on the derived neuromuscular signature.

In one aspect, the at least one personal characteristic of the user comprises at least one pattern of muscle activity or motor unit activation detected in the plurality of neuromuscular signals and/or the information based on the plurality of neuromuscular signals.

In another aspect, the plurality of neuromuscular sensors are configured to record the plurality of neuromuscular signals during performance of at least one gesture by the user.

In another aspect, identifying the user comprises comparing the derived neuromuscular signature associated with the at least one gesture with a previously stored neuromuscular signature of the user.

In another aspect, deriving the neuromuscular signature for the user comprises continuously deriving the neuromuscular signature from the plurality of neuromuscular signals and/or information based on the plurality of neuromuscular signals.

In another aspect, deriving the neuromuscular signature for the user comprises periodically deriving the neuromuscular signature from the plurality of neuromuscular signals and/or information based on the plurality of neuromuscular signals.

In another aspect, deriving the neuromuscular signature for the user comprises deriving the neuromuscular signature in response to detection of an event.

In another aspect, the at least one computer processor is further programmed to: store, in a memory device, the plurality of neuromuscular signals, information based on the plurality of neuromuscular signals, and/or the derived neuromuscular signature.

In another aspect, the computerized system further comprises: a server device configured to identify the user, wherein the at least one computer processor is further programmed to communicate at least the derived neuromuscular signature to the server device.

In another aspect, the at least one computer processor is further programmed to: derive a plurality of neuromuscular signatures for the user from the plurality of neuromuscular signals and/or information based on the plurality of neuromuscular signals recorded over time; track one or more changes between the plurality of neuromuscular signatures over time; and update the neuromuscular signature stored in the memory device to account for the one or more changes.

In another aspect, deriving the neuromuscular signature for the user comprises deriving a covariance matrix from the plurality of neuromuscular signals.

In another aspect, deriving the neuromuscular signature for the user comprises deriving spectral information from the plurality of neuromuscular signals.

In another aspect, deriving the neuromuscular signature for the user comprises deriving the neuromuscular signature from an output of a trained inference model that receives the plurality of neuromuscular signals as input.

In another aspect, the at least one computer processor is further programmed to authenticate the user based on the neuromuscular signature.

In another aspect, authenticating the user comprises: determining a first confidence level associated with the derived neuromuscular signature; and authenticating the user based on the neuromuscular signature and one or more authentication factors when the first confidence level is below a first predetermined threshold.

In another aspect, authenticating the user further comprises: determining a second confidence level associated with the neuromuscular signature; and authenticating the user based on the neuromuscular signature and a reduced number of the one or more authentication factors when the second confidence level is more than the first confidence level.

In another aspect, authenticating the user further comprises authenticating the user based on only the neuromuscular signature when the second confidence level exceeds a second predetermined threshold.

Some embodiments are directed to a computerized system for authenticating a user based on neuromuscular signals. The system comprises a plurality of neuromuscular sensors configured to record a plurality of neuromuscular signals from a user, wherein the plurality of neuromuscular sensors are arranged on one or more wearable devices. The system further comprises at least one computer processor programmed to: derive a neuromuscular signature for the user from the plurality of neuromuscular signals and/or information based on the plurality of neuromuscular signals, wherein the neuromuscular signature is indicative of at least one personal characteristic of the user detected in the plurality of neuromuscular signals; and authenticate the user based on the derived neuromuscular signature.

In one aspect, authenticating the user comprises: determining a first confidence level associated with the derived neuromuscular signature; and authenticating the user based on the neuromuscular signature and one or more authentication factors when the first confidence level is below a first predetermined threshold.

In another aspect, authenticating the user further comprises: determining a second confidence level associated with the neuromuscular signature; and authenticating the user based on the neuromuscular signature and a reduced number of the one or more authentication factors when the second confidence level is more than the first confidence level.

Some embodiments are directed to a method for authenticating a user based on neuromuscular signals. The method comprises recording, using a plurality of neuromuscular sensors arranged on one or more wearable devices, a plurality of neuromuscular signals from a user; deriving a neuromuscular signature for the user from the plurality of neuromuscular signals and/or information based on the plurality of neuromuscular signals, wherein the neuromuscular signature is indicative of at least one personal characteristic of the user detected in the plurality of neuromuscular signals; and authenticating the user based on the derived neuromuscular signature.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

Various non-limiting embodiments of the technology will be described with reference to the following figures. It should be appreciated that the figures are not necessarily drawn to scale.

FIGS. 8A and 8B schematically illustrate components of a computer-based system on which some embodiments are implemented. FIG. 8A illustrates a wearable portion of the computer-based system and FIG. 8B illustrates a dongle portion connected to a computer, wherein the dongle portion is configured to communicate with the wearable portion.

DETAILED DESCRIPTION

Figure 1:
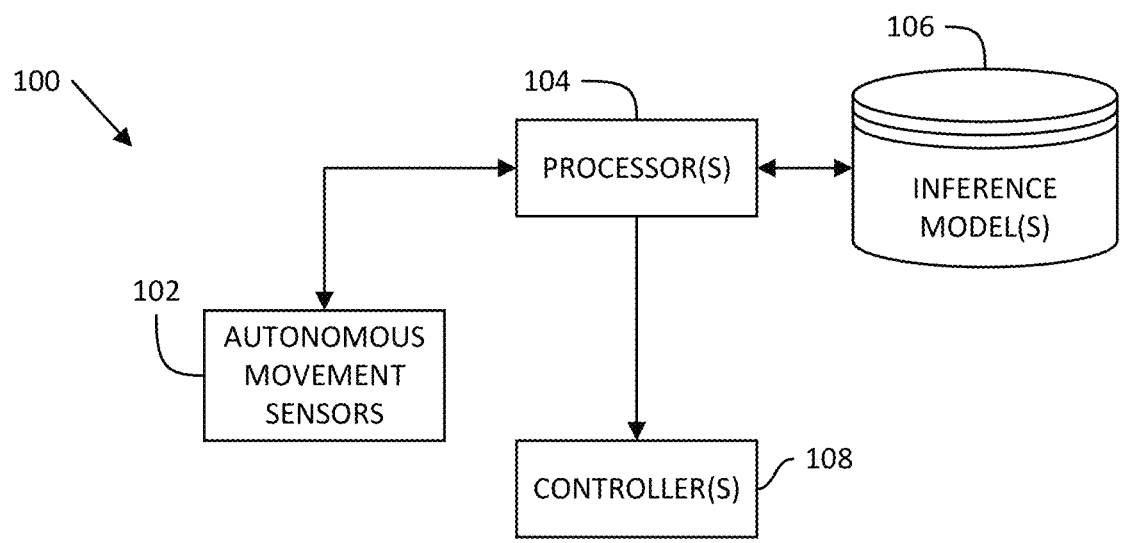
FIG. 1 is a schematic diagram of a computer-based system for performing user identification and/or authentication in accordance with some embodiments of the technology described herein.

The inventors have recognized that some conventional biometric techniques used for authenticating or identifying individuals may be improved. Existing techniques for authenticating or identifying individuals pose difficulties with respect to the manner in which data is acquired, data security, spoofing, etc. For example, certain biometric identification techniques require individuals to participate or perform particular actions that may be undesirable for or otherwise pose a burden on the individuals, such as, placing a finger on a scanner for fingerprint recognition or placing the individual's face near a scanner in a stable manner that allows the scanner to take an image of the iris for iris recognition. In addition, an individual's biometric information can be stolen and used to fraudulently gain access to resources to which the individual has access. For instance, an imposter may use a high quality picture of the individual's iris at an iris scanner located at an entrance to a restricted area to fraudulently gain access to the restricted area. Similarly, an imposter may use a recorded fingerprint at a fingerprint scanner located at the entrance to pose as an authorized user and gain access to the restricted area. Furthermore, relying on the individual's biometric information to authenticate actions performed by the individual allows such information to be used by an imposter even when the individual is under duress or otherwise physically unable to provide the information (e.g., when the individual is in an unconscious state or no longer alive). Moreover, most biometric authentication techniques enable extended secure access after authentication and are limited for assuring continuous authentication.

In accordance with some embodiments, signals recorded from wearable sensors are used to perform user identification and/or authentication. The inventors have recognized that such signals include characteristics that enable the sensor data to be used for accurate identification and/or authentication of a user. In some embodiments, authenticating the user may include authorizing the user to perform certain actions, e.g., accessing a restricted area, accessing resources of a computer system or website, performing online transactions, and/or performing other actions requiring authorization. Authenticating the user may involve a binary decision (e.g., yes or no) indicating whether the user is authorized or not. In some embodiments, identifying the user may include determining that the user (e.g., an authorized or other user) is who he/she is claiming to be. For example, identifying the user may include determining who the user is from a group of candidates, for example to load a user-specific profile.

According to some embodiments, the characteristics determined from the sensor data may be used to determine a neuromuscular signature that is indicative of at least one personal characteristic (e.g., a pattern of muscle activity or motor unit activation) of the user. In some embodiments, the neuromuscular signature may be derived, at least in part, from raw sensor signals collected by one or more of the wearable sensors. In some embodiments, the neuromuscular signature may be derived, at least in part, from processed sensor signals, where the raw sensor signals collected by one or more of the wearable sensors are processed to perform amplification, filtering, rectification, and/or other forms of signal processing, examples of which are described in more detail below. In some embodiments, the neuromuscular signature may be derived, at least in part, from an output of a trained inference model that receives the sensor signals (or processed versions of the sensor signals) as input. In contrast to some conventional user identification/authentication techniques, neuromuscular characteristics, determined based on sensor signals in accordance with the techniques described herein, cannot be readily stolen or captured using external sensors, scanners, or cameras, thereby reducing the risk that the identifying/authenticating information is used for fraudulent purposes. In some instances, using neuromuscular characteristics to identify and/or authenticate a user obviates the need for remembering secrets or performing particular actions, thereby reducing the memory burden on the individual. For example, sensor data may be recorded and neuromuscular characteristics may be derived from the recorded sensor data as the user goes about his/her normal daily routine. Additionally, in instances where the user is under duress (e.g., the user's motion is restrained or limited in some way) or otherwise incapable of movement (e.g., a person who is deceased), the neuromuscular characteristics may not be effectively used for authentication purposes. In contrast to some conventional user identification/authentication techniques, neuromuscular characteristics, determined based on sensor signals in accordance with the techniques described herein, can be continuously monitored and secure access revoked if the neuromuscular characteristics of a previously-authenticated user are no longer present in the signals made available to the user identification and/or authentication system.

As described briefly above, in some embodiments, a neuromuscular signature is determined directly from recorded sensor data. In other embodiments, a neuromuscular signature is derived based, at least in part, on the output of a trained statistical model. In some implementations, the statistical model(s) can include one or more inference models, one or more machine learning models, and/or a combination of one or more inference model(s) and/or one or more machine learning model(s). A further discussion of the implementation of the inference model is provided below. In some embodiments, the trained inference model may output motor unit or muscle activations and/or position, orientation, and/or force estimates for segments of a computer-generated musculoskeletal model. In one example, all or portions of the human musculoskeletal system can be modeled as a multi-segment articulated rigid body system, with joints forming the interfaces between the different segments and joint angles defining the spatial relationships between connected segments in the model. Constraints on the movement at the joints are governed by the type of joint connecting the segments and the biological structures (e.g., muscles, tendons, ligaments) that restrict the range of movement at the joint. For example, the shoulder joint connecting the upper arm to the torso and the hip joint connecting the upper leg to the torso are ball and socket joints that permit extension and flexion movements as well as rotational movements. By contrast, the elbow joint connecting the upper arm and the forearm and the knee joint connecting the upper leg and the lower leg allow for a more limited range of motion. In this example, a multi-segment articulated rigid body system is used to model portions of the human musculoskeletal system. However, it should be appreciated that some segments of the human musculoskeletal system (e.g., the forearm), though approximated as a rigid body in the articulated rigid body system, may include multiple rigid structures (e.g., the ulna and radius bones of the forearm) that provide for more complex movement within the segment that is not explicitly considered by the rigid body model. Accordingly, a model of an articulated rigid body system for use with some embodiments of the technology described herein may include segments that represent a combination of body parts that are not strictly rigid bodies. It will be appreciated that physical models other than the multi-segment articulated rigid body system may be used to model portions of the human musculoskeletal system without departing from the scope of this disclosure.

Continuing with the example above, in kinematics, rigid bodies are objects that exhibit various attributes of motion (e.g., position, orientation, angular velocity, acceleration). Knowing the motion attributes of one segment of the rigid body enables the motion attributes for other segments of the rigid body to be determined based on constraints in how the segments are connected. For example, the hand may be modeled as a multi-segment articulated body with the joints in the wrist and each finger forming the interfaces between the multiple segments in the model. In some embodiments, movements of the segments in the rigid body model can be simulated as an articulated rigid body system in which position (e.g., actual position, relative position, or orientation) information of a segment relative to other segments in the model are predicted using a trained inference model, as described in more detail below.

The portion of the human body approximated by a musculoskeletal representation as described herein as one non-limiting example, is a hand or a combination of a hand with one or more arm segments. The information used to describe a current state of the positional relationships between segments, force relationships for individual segments or combinations of segments, and muscle and motor unit activation relationships between segments, in the musculoskeletal representation is referred to herein as the handstate of the musculoskeletal representation. It should be appreciated, however, that the techniques described herein are also applicable to musculoskeletal representations of portions of the body other than the hand including, but not limited to, an arm, a leg, a foot, a torso, a neck, or any combination of the foregoing.

In addition to spatial (e.g., position/orientation) information, some embodiments are configured to predict force information associated with one or more segments of the musculoskeletal representation. For example, linear forces or rotational (torque) forces exerted by one or more segments may be estimated. Examples of linear forces include, but are not limited to, the force of a finger or hand pressing on a solid object such as a table, and a force exerted when two segments (e.g., two fingers) are pinched together. Examples of rotational forces include, but are not limited to, rotational forces created when segments in the wrist or fingers are twisted or flexed. In some embodiments, the force information determined as a portion of a current handstate estimate includes one or more of pinching force information, grasping force information, or information about co-contraction forces between muscles represented by the musculoskeletal representation.

In some embodiments, determining a musculoskeletal representation based on the output of the inference model may not be necessary, as the output of the inference model may itself be an indication of whether a particular user is identified or authenticated. For example, an inference model used in accordance with some embodiments may be trained, based on recorded sensor data, to associate the recorded sensor data with a particular user by representing one or more personal characteristics of the user in the parameters or weights of the model that are learned as part of the model training process. In such embodiments, described in more detail below, a neuromuscular signature of the user may be embodied in the learned parameters or weights of the inference model rather than being derived based on the output of the model. The parameters or weights of the inference model and/or the trained inference model may therefore be stored as the neuromuscular signature of the user for subsequent use in identifying and/or authenticating the user.

FIG. 1 illustrates a system 100 in accordance with some embodiments. The system includes a plurality of sensors 102 configured to record signals resulting from the movement of portions of a human body. Sensors 102 may include a plurality of neuromuscular sensors configured to record signals arising from neuromuscular activity in skeletal muscle of a human body. The term "neuromuscular activity" as used herein refers to neural activation of spinal motor neurons that innervate a muscle, muscle activation, muscle contraction, or any combination of the neural activation, muscle activation, and muscle contraction. Neuromuscular sensors may include one or more electromyography (EMG) sensors, one or more mechanomyography (MMG) sensors, one or more electrical impedance tomography (EIT) sensors, one or more sonomyography (SMG) sensors, a combination of two or more types of EMG sensors, MMG sensors, EIT sensors, and SMG sensors, and/or one or more sensors of any suitable type that are configured to detect neuromuscular signals. In some embodiments, the plurality of neuromuscular sensors may be used to sense muscular activity related to a movement of the part of the body controlled by muscles from which the neuromuscular sensors are arranged to sense the muscle activity. Spatial information (e.g., position and/or orientation information) and force information describing the movement may be predicted based on the sensed neuromuscular signals as the user moves over time.

As the tension of a muscle increases during performance of a motor task, the firing rates of active neurons increases and additional neurons may become active, which is a process referred to as motor unit recruitment. The pattern by which neurons become active and increase their firing rate is stereotyped, such that the expected motor unit recruitment patterns define an activity manifold associated with standard or normal movement. Some embodiments record activation of a single motor unit or a group of motor units that are "off-manifold," in that the pattern of motor unit activation is different than an expected or typical motor unit recruitment pattern. Such off-manifold activation is referred to herein as, "sub-muscular activation" or "activation of a sub-muscular structure," where a sub-muscular structure refers to the single motor unit or the group of motor units associated with the off-manifold activation. Examples of off-manifold motor unit recruitment patterns include, but are not limited to, selectively activating a high-threshold motor unit without activating a lower-threshold motor unit that would normally be activated earlier in the recruitment order and modulating the firing rate of a motor unit across a substantial range without modulating the activity of other neurons that would normally be co-modulated in typical motor recruitment patterns. Sub-muscular activation may be used, at least in part, to determine a neuromuscular signature and/or to perform authentication or identification in accordance with some embodiments of the technology described herein.

Sensors 102 may include one or more Inertial Measurement Units (IMUs), which measure a combination of physical aspects of motion, using, for example, an accelerometer, a gyroscope, a magnetometer, or any combination of one or more accelerometers, gyroscopes and magnetometers. In some embodiments, IMUs may be used to sense information about the movement of the part of the body on which the IMU is attached and information derived from the sensed data (e.g., position and/or orientation information) may be tracked as the user moves over time. For example, one or more IMUs may be used to track movements of portions of a user's body proximal to the user's torso relative to the sensor (e.g., arms, legs) as the user moves over time.

In embodiments that include at least one IMU and a plurality of neuromuscular sensors, the IMU(s) and neuromuscular sensors may be arranged to detect movement of different parts of the human body. For example, the IMU(s) may be arranged to detect movements of one or more body segments proximal to the torso (e.g., an upper arm), whereas the neuromuscular sensors may be arranged to detect movements of one or more body segments distal to the torso (e.g., a forearm or wrist). It should be appreciated, however, that the sensors may be arranged in any suitable way, and embodiments of the technology described herein are not limited based on the particular sensor arrangement. For example, in some embodiments, at least one IMU and a plurality of neuromuscular sensors may be co-located on a body segment to track movements of body segment using different types of measurements. In one implementation described in more detail below, an IMU sensor and a plurality of EMG sensors are arranged on a wearable device configured to be worn around the lower arm or wrist of a user. In such an arrangement, the IMU sensor may be configured to track movement information (e.g., positioning and/or orientation over time) associated with one or more arm segments, to determine, for example whether the user has raised or lowered their arm, whereas the EMG sensors may be configured to determine movement information associated with wrist or hand segments to determine, for example, whether the user has an open or closed hand configuration.

Each of the sensors 102 includes one or more sensing components configured to sense information about a user. In the case of IMUs, the sensing components may include one or more accelerometers, gyroscopes, magnetometers, or any combination thereof to measure characteristics of body motion, examples of which include, but are not limited to, acceleration, angular velocity, and sensed magnetic field around the body. In the case of neuromuscular sensors, the sensing components may include, but are not limited to, electrodes configured to detect electric potentials on the surface of the body (e.g., for EMG sensors) vibration sensors configured to measure skin surface vibrations (e.g., for MMG sensors), and acoustic sensing components configured to measure ultrasound signals (e.g., for SMG sensors) arising from muscle activity.

In some embodiments, at least some of the plurality of sensors 102 are arranged as a portion of a wearable device configured to be worn on or around part of a user's body. For example, in one non-limiting example, an IMU sensor and a plurality of neuromuscular sensors are arranged circumferentially around an adjustable and/or elastic band such as a wristband or armband configured to be worn around a user's wrist or arm. Alternatively, at least some of the sensors may be arranged on a wearable patch configured to be affixed to a portion of the user's body. In some embodiments, multiple wearable devices, each having one or more IMUs and/or neuromuscular sensors included thereon may be used to predict musculoskeletal position information for movements that involve multiple parts of the body.

In some embodiments, sensors 102 only includes a plurality of neuromuscular sensors (e.g., EMG sensors). In other embodiments, sensors 102 includes a plurality of neuromuscular sensors and at least one "auxiliary" sensor configured to continuously record a plurality of auxiliary signals. Examples of auxiliary sensors include, but are not limited to, other sensors such as IMU sensors, and non-autonomous sensors such as an imaging device (e.g., a camera), a radiation-based sensor for use with a radiation-generation device (e.g., a laser-scanning device), or other types of sensors such as a heart-rate monitor.

In some embodiments, the output of one or more of the sensing components may be optionally processed using hardware signal processing circuitry (e.g., to perform amplification, filtering, and/or rectification). In other embodiments, at least some signal processing of the output of the sensing components may be performed in software. Thus, signal processing of signals recorded by the sensors may be performed in hardware, software, or by any suitable combination of hardware and software, as aspects of the technology described herein are not limited in this respect.

In some embodiments, the recorded sensor data may be optionally processed to compute additional derived measurements that are then provided as input to an inference model, as described in more detail below. For example, recorded signals from an IMU sensor may be processed to derive an orientation signal that specifies the orientation of a rigid body segment over time or to provide additional biometric data (e.g., related to movements) that may be used for identification and/or authentication of a user wearing a device that includes an IMU sensor. Sensors 102 may implement signal processing using components integrated with the sensing components, or at least a portion of the signal processing may be performed by one or more components in communication with, but not directly integrated with the sensing components of the sensors.

System 100 also includes one or more computer processors 104 programmed to communicate with sensors 102. For example, signals recorded by one or more of the sensors may be provided to the processor(s), which may be programmed to execute one or more machine learning techniques that process signals output by the sensors 102 to train one or more inference models 106, and the trained (or retrained) inference model(s) 106 may be stored for later use in user authentication and identification, as described in more detail below. Non-limiting examples of inference models 106 that may be used in accordance with some embodiments for user authentication and/or identification and to predict handstate information based on recorded signals from sensors 102 are discussed in more detail below.

System 100 also optionally includes one or more controllers 108. For example, controller 108 may be a display controller configured to display a visual representation 108 (e.g., of a hand) or an indicator associated with an identified or authenticated user profile. As discussed in more detail below, one or more computer processors may implement one or more trained inference models that receive as input signals recorded by sensors 102 and provide as output information (e.g., predicted handstate information or other information) that may be used for user authentication and/or identification purposes. For example, the output information may include information associated with an authenticated and/or identified user profile, information indicating whether a user (or no user) can be authenticated and/or identified based on the input signals recorded by sensors 102, and/or other information.

In some embodiments, a computer application configured to simulate a virtual reality environment may be instructed to display a visual character such as an avatar (e.g., via controller 108). Positioning, movement, and/or forces applied by portions of the visual character within the virtual reality environment may be displayed based on the output of the trained inference model(s). The visual representation may be dynamically updated as continuous signals are recorded by the sensors 102 and processed by the trained inference model(s) 104 to provide a computer-generated representation of the character's movement that is updated in real-time. In some embodiments, a user may be guided or prompted (via a user interface) concerning the type, variety, or other aspects of neuromuscular activations (and, optionally, movements) in order to capture data with appropriate characteristics for effectively training and/or implementing an inference model for user identification and/or authentication. Different types or forms of prompts may be utilized without departing from the scope of this disclosure. For example, any form of visual prompt (e.g., displayed text instructions or visual guidance based on static images or video), auditory prompt (e.g., verbal instructions, an auditory representation of recorded neuromuscular signals, or other auditory prompt), haptic prompt (e.g. haptic feedback indicating that sufficient data has been collected and is being used to train or implement an inference model for authentication and/or identification of a user), or other prompt may be used to guide/prompt the user to cause or generate neuromuscular activations that may be used by the systems and methods disclosed herein for purposes of user identification and/or authentication.

As discussed above, some embodiments are directed to using an inference model for predicting musculoskeletal information based on signals recorded from wearable sensors. As discussed briefly above in the example where portions of the human musculoskeletal system can be modeled as a multi-segment articulated rigid body system, the types of joints between segments in a multi-segment articulated rigid body model constrain movement of the rigid body. Additionally, different individuals tend to move in characteristic ways when performing a task that can be captured in patterns of individual user behavior. At least some of these constraints on human body movement may be explicitly incorporated into inference models used for prediction in accordance with some embodiments. Additionally or alternatively, the constraints may be learned by the inference model though training based on recorded sensor data. As described in detail below, the constraints may comprise part of the inference model itself being represented by information (e.g., connection weights between nodes) in the model.

As discussed above, some embodiments are directed to using an inference model for predicting handstate information to enable the generation and/or real-time update of a computer-based musculoskeletal representation. The inference model may be used to predict the handstate information based on IMU signals, neuromuscular signals (e.g., EMG, MMG, and SMG signals), external device signals (e.g., camera or laser-scanning signals), or a combination of IMU signals, neuromuscular signals, and external device signals detected as a user performs one or more movements.

Figure 2:
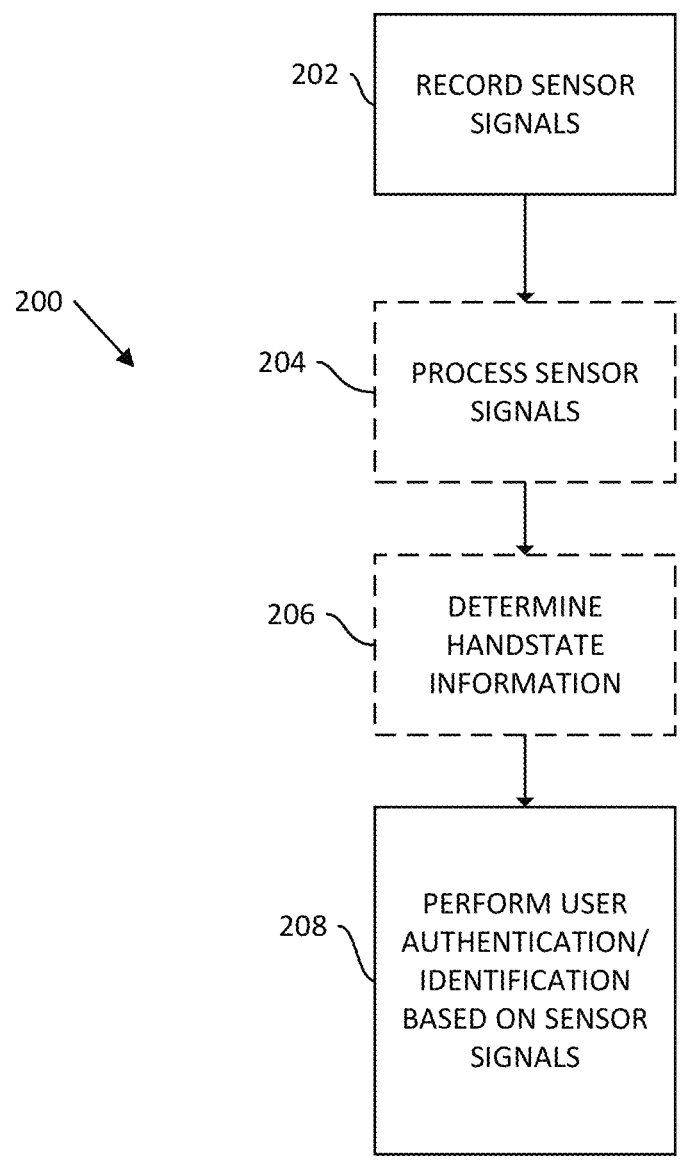
FIG. 2 is a flowchart of a process for authenticating and/or identifying a user based on sensor signals in accordance with some embodiments of the technology described herein.

FIG. 2 illustrates a process 200 for authenticating and/or identifying a user based on recorded sensor signals in accordance with some embodiments. In act 202, sensor signals may be recorded by one or more sensors 102 (also referred to herein as "raw sensor signals"). In some embodiments, the sensors include a plurality of neuromuscular sensors (e.g., EMG sensors) arranged on a wearable device worn by a user. For example, EMG sensors may be arranged on an elastic band configured to be worn around a wrist or forearm of the user to record neuromuscular signals from the user as the user performs various movements or gestures. An example wearable device that may be used in accordance with some embodiments is shown and described in detail below.

As used herein, the term "gestures" refers to a static or dynamic configuration of one or more body parts including the position of the one or more body parts and forces associated with the configuration. For example, gestures include discrete gestures, such as placing or pressing the palm of a hand down on a solid surface or grasping a ball, continuous gestures, such as waving a finger back and forth, grasping and throwing a ball, or a combination of discrete and continuous gestures. Gestures may include covert gestures that are imperceptible to another person, such as slightly tensing a joint by co-contracting opposing muscles, or using sub-muscular activations. Gestures may be defined by an application configured to prompt a user to perform the gestures or, alternatively, gestures may be arbitrarily defined by a user. The gestures performed by the user may include symbolic gestures (e.g., gestures mapped to other gestures, interactions, or commands, for example, based on a gesture vocabulary that specifies the mapping). In some cases, hand and arm gestures may be symbolic and used to communicate according to cultural standards.

In addition to a plurality of neuromuscular sensors, some embodiments include one or more auxiliary sensors configured to record auxiliary signals that may also be provided as input to the one or more trained inference models. Examples of auxiliary sensors include IMU sensors, imaging devices, radiation detection devices (e.g., laser scanning devices), heart rate monitors, or any other type of biosensors configured to record biophysical information from the user during performance of one or more movements or gestures.

Process 200 then proceeds to act 204, where the raw sensor signals recorded by the sensors 102 are optionally processed. In some embodiments, the raw sensor signals may be processed using hardware signal processing circuitry (e.g., to perform amplification, filtering, and/or rectification). In other embodiments, at least some signal processing of the raw sensor signals may be performed in software. Accordingly, signal processing of the raw sensor signals recorded by the sensors may be performed in hardware, software, or by any suitable combination of hardware and software. In some implementations, the raw sensor signals may be processed to derive other signal data. For example, accelerometer data recorded by one or more IMU sensors may be integrated and/or filtered to determine derived signal data associated with one or more muscles during activation of a muscle or performance of a gesture.

Process 200 then proceeds to act 206, where the raw sensor signals or the processed sensor signals are optionally provided as input to the trained inference model(s) configured to output information, such as handstate information and/or information that can be used for purposes of identification and/or authentication. For example, the output information may include information indicating whether the user wearing the wearable device is the user requesting authentication (e.g., a likelihood that the user wearing the wearable device is the user requesting authentication), information indicating which user is wearing the wearable device (e.g., information identifying the user wearing the wearable device), and/or other information.

Process 200 then proceeds to act 208, where user authentication and/or identification is performed based on the raw sensor signals, the processed sensor signals, and/or the outputs of the trained inference model(s). In some embodiments, user authentication and/or identification may be performed based on a neuromuscular signature for the user that is derived from the raw sensor signals, the processed sensor signals, and/or the outputs of the trained inference model(s).

According to some embodiments, the one or more computer processors 104 of system 100 may be programmed to derive a neuromuscular signature for a user from signals recorded by sensors 102 (e.g., the raw sensor signals) and/or information based on these signals. The information based on the signals recorded by sensors 102 may include information associated with processed sensor signals (e.g., processed EMG signals) and/or information associated with outputs of the trained inference model. The neuromuscular signature is indicative of one or more personal characteristics of the user detected in the signals and/or information based on the signals. In some embodiments, the one or more personal characteristics may include patterns of muscle activity detected in the signals and/or information based on the signals. For instance, spatiotemporal patterns of muscle activity may be detected in the signals and/or information based on the signals as a user goes about his/her normal routine. Alternatively, the spatiotemporal patterns of muscle activity may be determined when the user performs a certain task or gesture. In yet further embodiments, the spatiotemporal patterns of muscle activity levels may be determined based, at least in part, on signals recorded during normal activity and based, at least in part, on signals recorded during performance of a certain task or gesture. In some embodiments, the one or more personal characteristics may include characteristics of the user's motor system, such as motor unit activation, motor unit action potential waveforms, and/or other characteristics detected in the signals and/or information based on the signals. For instance, timings of motor unit action potentials and muscle activations may be detected in the signals and/or information based on the signals as the user goes about his/her normal routine and/or when the user performs a certain task or gesture. In some embodiments, the one or more personal characteristics may reflect variability in which muscles are present, muscle activity levels and/or motor unit/muscle activations in different individuals. Such variability may be due to unique patterns of motor neuron innervation of muscle fibers, individual characteristics of motor unit activation for a particular muscle contraction or other reasons that correspond to the state of the motor nervous system such as presence of a neurological disorder (e.g., tremors, synergies, etc.).

Figure 3A:
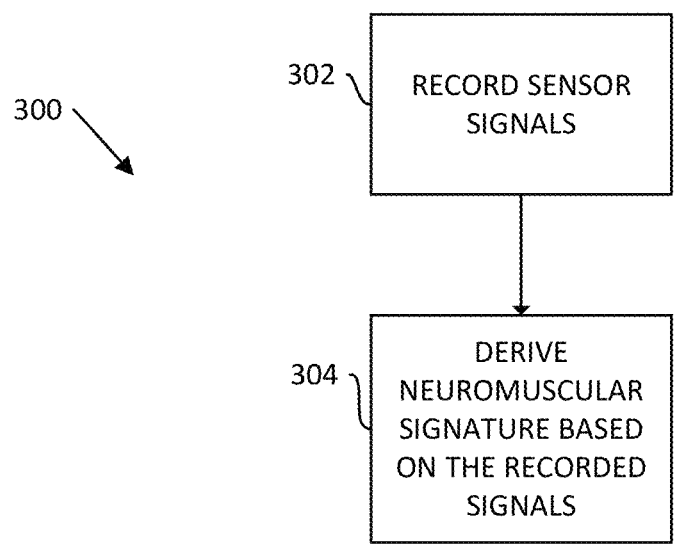
FIG. 3A is a flowchart of a process for deriving a neuromuscular signature for a user from sensor signals in accordance with some embodiments of the technology described herein.

FIG. 3A illustrates a process 300 for deriving a neuromuscular signature for the user based on sensor signals in accordance with some embodiments. In act 302, sensor signals are recorded by one or more sensors such as neuromuscular sensors (e.g., EMG sensors) and/or auxiliary sensors (e.g., IMU sensors, imaging devices, radiation detection devices, heart rate monitors, or any other type of biosensors).

In act 304, a neuromuscular signature may be derived based on the sensor signals. The one or more computer processors 104 of system 100 may be programmed to derive the neuromuscular signature from the raw sensor signals and/or the processed sensor signals. The one or more computer processors 104 may implement an inference model previously trained to authenticate or identify an individual based on a neuromuscular signature derived from the raw sensor signals and/or the processed sensor signals input to the inference model. In some embodiments, the one or more computer processors may include or communicate with one or more detector circuits that are programmed to analyze or process the sensors signals to identify or detect the personal characteristics of the user in the sensor signals. For example, a detector circuit may be provided to identify at least one pattern of muscle activity or motor unit activation in the sensor signals. Different detector circuits may be provided for detecting other personal characteristics from the sensor signals.

In some embodiments, the one or more computer processors may be programmed to derive the neuromuscular signature by performing various statistical analyses on the sensor signals. In some embodiments, the one or more computer processors may be programmed to extract one or more features from the sensor signals and train a classifier using the extracted features. The classifier may be a binary or multi-class classifier, and may include a linear discriminant analysis classifier, a quadratic discriminant analysis classifier, a support vector machine, a Gaussian mixture model, a regression based classifier, a decision tree classifier, a Bayesian classifier, a neural network classifier, a random forest classifier, and/or any other suitable classifier, as aspects of the technology described herein are not limited in this respect. In some embodiments, the sensor signals may be analyzed as time series data recorded during normal activity and/or during performance of a certain task or gesture. As described above, in some embodiments, the neuromuscular signature is embodied as a set of parameters or weights associated with a trained inference model.

In some embodiments, the inference model used to authenticate and/or identify a user may be a neural network and, for example, may be a recurrent neural network. In some embodiments, the recurrent neural network may be a long short-term memory (LSTM) neural network. It should be appreciated, however, that the recurrent neural network is not limited to being an LSTM neural network and may have any other suitable architecture. For example, in some embodiments, the recurrent neural network may be a fully recurrent neural network, a recursive neural network, a variational autoencoder, a Hopfield neural network, an associative memory neural network, an Elman neural network, a Jordan neural network, an echo state neural network, a second order recurrent neural network, and/or any other suitable type of recurrent neural network. In other embodiments, neural networks that are not recurrent neural networks may be used. For example, deep neural networks, convolutional neural networks, and/or feedforward neural networks, may be used. It should be appreciated that, in some embodiments, any other suitable non-linear regression model may be used instead of a neural network, as aspects of the technology described herein are not limited in this respect. It should be appreciated that aspects of the technology described herein are not limited to using neural networks, as other types of inference models may be employed in some embodiments.

In some embodiments, the one or more features may include a covariance matrix extracted from the sensor signals. The covariance matrix may be extracted from signals recorded during normal activity (e.g., free-form movements) and/or from signals recorded during performance of a certain task or gesture. In some embodiments, multiple covariance matrices may be extracted corresponding respectively to a sequence of gestures performed by a user.

In some embodiments, the one or more features may include spectral information extracted or otherwise derived from the sensor signals. For example, power spectral density on each EMG electrode and/or co-spectrum information (e.g., co-spectrum matrix) may be derived from the sensor signals. The spectral information may be determined from signals recorded during normal activity (e.g., free-form movements) and/or from signals recorded during performance of a certain task or gesture using signal processing techniques. Other types of statistical analyses may be performed without departing from the scope of this disclosure.

In some embodiments, the classifier may be trained based on sensor data collected from the user and/or other individuals. In some embodiments, the sensor data may be collected from the user during a training period and may be augmented as the user continues to use the system. In some embodiments, the sensor data from the other individuals may be collected and used to train the classifier prior to shipping the system to the user and the sensor data may be augmented as and when additional data is obtained from the other individuals.

Figure 3B:
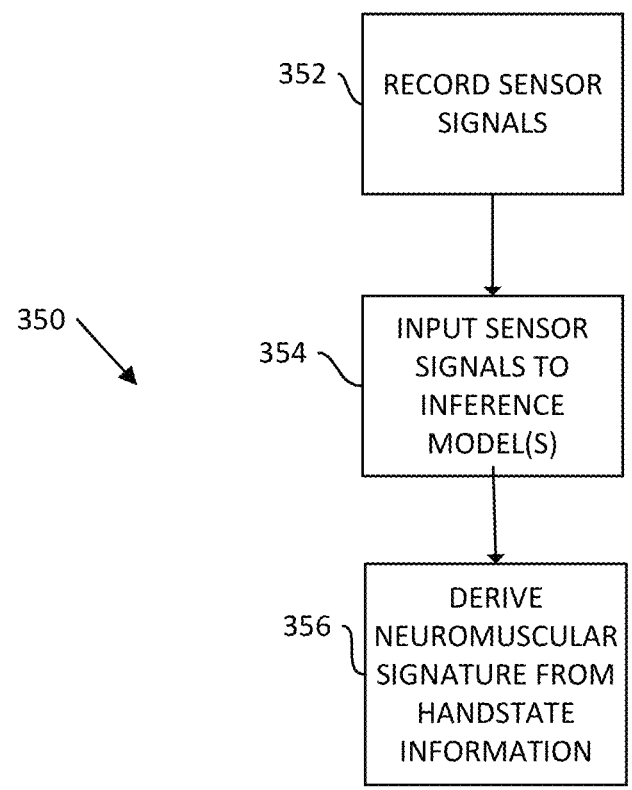
FIG. 3B is a flowchart of a process for deriving a neuromuscular signature for a user from information based on sensor signals in accordance with some embodiments of the technology described herein.

FIG. 3B illustrates a process 350 for deriving a neuromuscular signature for a user from information based on the sensor signals in accordance with some embodiments. In act 352, sensor signals are recorded by one or more sensors such as neuromuscular sensors (e.g., EMG sensors) and/or auxiliary sensors (e.g., IMU sensors, imaging devices, radiation detection devices, heart rate monitors, or any other type of biosensors).

In act 354, the sensor signals recorded by the sensors are provided as input to one or more trained inference models used to generate estimates of handstate information, as described briefly above. The process 300 then proceeds to act 356, where the neuromuscular signature is derived from the handstate information. The one or more computer processors of system 100 may be programmed to derive the neuromuscular signature from the sensor signals, the handstate information, and/or a combination of the sensor signals and the handstate information.

In some embodiments, the handstate information may be used to condition the determination of features from the sensor signals during performance of a certain task or gesture, such as, a first motion. The gesture performed by the user may be determined from the handstate information, which may inform the feature extraction process. For example, a covariance matrix may be derived from the sensor data during performance of the first motion as detected in the handstate information. In some embodiments, the handstate information may be used to guide or otherwise prompt the user to perform a set of gestures, poses, or free-form movements that contain neuromuscular signals amenable for use in training and implementing an inference model for user identification and/or authentication.

For example, certain gestures activate either too few motor units (e.g. a relaxed arm, hand, and fingers) or statically activate too many motor units (e.g. a first position held statically) to effectively identify and/or authenticate a user. In such cases, the systems and methods described herein may provide guidance or prompt the user to adjust their movements (e.g., muscle activations) to generate additional data (e.g., additional neuromuscular signals or signals from other sensors) amenable for performing user identification and/or authentication.

In some embodiments, a particular pattern of movement and/or muscle/motor-unit activation may be detected in the handstate information. In some embodiments, the pattern may be detected even when movements or activations are imperceptible to another person (e.g., co-contraction that stiffens different joints).

In some embodiments, the one or more computer processors may be programmed to utilize neural networks (e.g., deep neural networks) to detect personal characteristics from neuromuscular data (e.g., raw signals, processed signals, and/or handstate information) associated with a user for use in identification and/or authentication. For example, deep neural network learning (DNN) techniques may be used to derive the neuromuscular signature, where the neuromuscular signature may include or otherwise be represented as DNN coefficients determined based on the handstate information. Other examples include representing the neuromuscular signature as mid-level representations of a neural network or derived models (e.g., handstate joint angles). In some embodiments, information derived from the neural networks may be used as a feature input to the classifier described above. For example, the activations of units in a layer of a neural network could be used as a feature alone or in combination of other features, such as a covariance matrix.

According to some embodiments, the sensor signals may be recorded continuously during user movements including during performance of a gesture (e.g., a training, typing, or other gesture) and/or free-form movements. In some embodiments, the neuromuscular signature may be continuously derived from the continuously recorded signals. In some embodiments, the continuously recorded signals may be provided continuously as input to the trained inference model, resulting in real-time handstate information output from the trained inference model(s) and/or continuous authentication and/or identification of the user based on the output of the trained inference model(s). In some embodiments, the neuromuscular signature may be continuously derived from and/or updated based on the real-time handstate information. In some embodiments, the neuromuscular signature may be derived from the recorded/processed sensor signals and/or the real-time handstate information as and when needed (e.g., periodically or at certain times).

Systems and methods that provide continuous, intermittent and/or regularly queried identification and/or authentication offer significant security advantages by ensuring that the specified user continues to be the one whose signals are being transmitted to the identification and/or authentication system. Such systems or methods may be configured to confirm a user's identity and/or user's authentication/authorization status at least every 10 minutes, at least every minute, at least every 10 seconds, or at least once a second. Determining that neuromuscular signals are no longer associated with an identified and/or authenticated user may generally be detected with a short latency (e.g., less than 30 seconds, less than 15 seconds, less than 10 seconds, less than 5 seconds, less than 1 second, less than 500 ms, or less than 250 ms), thereby permitting rapid lock out for a user who lacks appropriate access credentials (e.g., as determined based on their neuromuscular signature).

The inventors have recognized that systems and methods that provide continuous, intermittent, and/or regularly queried identification and/or authentication may be used to overcome "man-in-the-middle" cybersecurity intrusions. By transmitting/communicating both the content of a message (e.g., a typed or other message provided as part of an authentication process using physical user interfaces or gestural controls) and a neuromuscular signature that can be used for user authentication and/or identification according to the various embodiments described herein, the provenance and/or source of a communication may be securely verified.

According to some embodiments, the sensor signals are recorded periodically, such as, at predetermined intervals. In these embodiments, the neuromuscular signature may also be derived periodically. In other embodiments, the sensor signals are recorded in response to detection of an event, such as in response to a prompt to login. In these embodiments, the neuromuscular signature may be derived in response to the detection of the event immediately following the detection of the event, after a certain time period following the detection of the event, and/or at other times. For example, when a login prompt is detected, the one or more computer processors may trigger the sensors to begin recording sensor signals, derive a neuromuscular signature from the recorded sensor signals, and authenticate the user when the derived neuromuscular signature matches a previously recorded neuromuscular signature of the user. In some embodiments, a user may type his/her user ID and the neuromuscular signals detected or recorded while the user is typing are used for immediate user identification and/or authentication. Alternatively, a user may simply type any phrase for identification and/or authentication.

According to some embodiments, system 100 also includes at least one memory device that is configured to store the recorded sensor signals and/or the one or more inference model(s). Alternatively or in addition to the recorded signals, the processed/derived signals determined from the recorded sensor data may be stored in the memory device. In some embodiments, the inferential model for user identification and/or authentication may be stored remotely (e.g., at a server device) and either downloaded for local user identification and/or authentication or neuromuscular signals (raw EMG, processed EMG, and/or other information such as handstate information derived from the neuromuscular signals) may be uploaded for remote identification and/or authentication.

In some embodiments, once a neuromuscular signature for the user has been derived from the sensor signals and/or information based on the sensor signals, the derived neuromuscular signature may be stored in the memory device. In some embodiments, the sensor signals and/or information based on the sensor signals from which the neuromuscular signature is derived may be stored in the memory device. The one or more computer processors of system 100 may be programmed to store the signature, the sensor signals, and/or information based on the sensor signals in the memory device.

The inventors have recognized that the neuromuscular signature of a user may change slightly over time, for example, as the user ages, and it may be desirable to update the stored neuromuscular signature for the user to account for these changes. According to some embodiments, the one or more computer processors of system 100 may be programmed to derive multiple neuromuscular signatures for the user over time. The one or more computer processors may be programmed to track changes between the stored neuromuscular signatures and update the neuromuscular signature stored in the memory device to account for the changes. In this manner, up-to-date neuromuscular signatures reflecting the current anatomy and physics of the user's body may be used to accurately authenticate and/or identify the user. The inventors have also recognized that deriving multiple neuromuscular signatures for the user over time can better characterize the distribution/variability of the user's neuromuscular signature and improve classifier performance.

According to some embodiments, the one or more computer processors of system 100 may maintain a profile for the user, where the profile includes the neuromuscular signature derived for the user and/or other identifying information associated with the user (e.g., user name, user id, security phrase, etc.). The profile may be stored in the memory device and/or stored remotely for access via a communication network. In some implementations, when changes are detected between a number of neuromuscular signatures derived for the user over time, the neuromuscular signature associated with the profile may be updated to account for the changes as long as the various neuromuscular signatures are within some specified bounds of similarity. For instance, as long as the patterns of muscle activity or motor unit activation between a previously derived and stored neuromuscular signature and a currently derived neuromuscular signature of the user are within some specified bounds of similarity, the currently derived neuromuscular signature may be considered acceptable, the profile may be updated with the currently derived neuromuscular signature, and the currently derived neuromuscular signature may be stored in the memory device in addition to or instead of the previously derived or stored neuromuscular signature. In some embodiments, the specified bounds of similarity may be a particular threshold that is determined based on a trade-off between false positive and false negatives and/or classifier performance. For example, different thresholds may be used based on whether false negatives should be reduced. In some instances it may be determined that false negatives should be reduced when high degree of security is desired (e.g., when accessing a bank account) even if more data and thus more time is required to authenticate the user.

In some embodiments, one or more computer processors of system 100 may be programmed to authenticate and/or identify the user based at least in part on the user's neuromuscular signature (e.g., user's currently derived neuromuscular signature). According to some embodiments, the currently derived neuromuscular signature may be compared with a previously stored neuromuscular signature to authenticate and/or identify the user.

In some implementations, sensor signals may be recorded during a training period in order to establish the stored neuromuscular signature against which the currently derived neuromuscular signature is compared. The training period may refer to a time period during which the user is prompted to activate one or more muscles (e.g., by performing at least one gesture) and the user's activation may be mapped to a neuromuscular signature derived for the user. For instance, during the training period, the system may prompt the user to perform at least one gesture. A neuromuscular signature for the user may be derived based on the sensor signals and/or information based on the sensor signals. Feedback may be provided to the user during the training period to help the user understand how the system is interpreting the user's intended muscle activations. For example, the system may be configured to display a visual representation of a gesture performed by the user so the user can better understand whether the system correctly interpreted the user's intended gesture. Alternatively or in addition, the system may provide a prompt or otherwise instruct the user to perform muscle activations (e.g., movements) that are amenable to be supplied as input to a trained inference model for user identification and/or authentication. In some embodiments, the neuromuscular signature derived during the training period may then be stored in the memory device. In some implementations, the neuromuscular signature and/or the associated gesture that the user performed during the training period may be stored in the memory device.

According to some embodiments, following the training period, the system may be used to authenticate and/or identify a user by deriving a current neuromuscular signature and comparing the currently-derived neuromuscular signature to a previously stored neuromuscular signature (e.g., the neuromuscular signature stored during the training period). For instance, when the user attempts to login to an account, the user may perform the same gesture that the user performed during the training period and a neuromuscular signature may be derived based on the associated sensor signals and/or information based on the sensor signals. This neuromuscular signature may be compared with the previously stored neuromuscular signature. In response to a determination that the neuromuscular signature substantially matches the previously stored neuromuscular signature, a determination may be made that the user is authorized to access the account and access may be granted to the user. In response to a determination that the neuromuscular signature does not substantially match the previously stored neuromuscular signature, a determination may be made that the user is not authorized to access the account and access may be denied. In some embodiments, a prompt may query the user as to whether he/she believes the failure to identify and/or authenticate was made in error and offer the user an opportunity to supply additional neuromuscular data to further train the inference model for identification and/or authentication.

In embodiments where multiple neuromuscular signatures for the user are stored in the memory device, the currently derived neuromuscular signature may be compared with the most recently stored neuromuscular signature in the memory device. It should be appreciated that the comparison may be performed with one or more of the previously stored neuromuscular signatures without departing from the scope of this disclosure.

According to some embodiments, the user may perform a gesture without being prompted to perform any specific gesture, and the system may identify and/or authenticate the user based on the performed gesture. In these embodiments, a representation of the performed gesture and a neuromuscular signature derived based on the performed gesture may be compared with a previously stored neuromuscular signature and a previously stored representation of the performed gesture (e.g., the neuromuscular signature and gesture stored during the training period) to authenticate and/or identify the user.

In some embodiments, user authentication based on a neuromuscular signature may be implemented using an inference model that provides binary output—either the neuromuscular signature is from the user to be authenticated or it is not. In some embodiments, a binary classification inference model may be trained for each user to be authenticated by a particular secure system. In some embodiments, a separate inference model may be trained for each user to be identified by the system. In some embodiments, the same inference model may be trained for each user for user identification and authentication. In some embodiments, the inference models (for authentication and/or identification) for multiple users (e.g., including the user to be authenticated) of the system may be stored in a memory device (local or remote). In some embodiments, the inference model(s) may be associated with the corresponding user's profile.

In some embodiments, an inference model for authentication of User X may be trained by utilizing (1) a pool of neuromuscular data from a set of users that does not include User X (also referred to herein as "null set") and (2) neuromuscular data from User X. The inference model may be trained by binary supervised classification using raw neuromuscular data or processed neuromuscular data and may optionally include data from other sensors such as an IMU as described herein. For example, an inference model for authentication may be trained end-to-end based one or more neuromuscular features (e.g., co-spectrum features). Various model architectures for a linear or non-linear model (including a neural network), as described herein, may be used for the binary classification task of authentication. For example, a long short-term memory (LSTM) model may be used for authentication because it captures temporal features in neuromuscular data that may be effective for user authentication.

In one embodiment, an inference model for user authentication may be trained using neuromuscular data from the user to be authenticated (which may be recorded in a single or multiple sessions) as well as a null set of data collected from a corpus of other users. For example, the size of the null set may be larger than 10 other users, larger than 50 other users, larger than 100 other users, larger than 1000 other users, or larger. While authentication may be improved for larger null sets, in some embodiments, a null set from 100 users may be used.

The inventors have recognized and appreciated that inference models for authentication may benefit from selecting data for the null set that is qualitatively similar to the neuromuscular signal data from the user to be authenticated. For example, qualitatively similar neuromuscular data has similar properties or features other than those that are characteristic or personal for a user (e.g., the noise characteristics of the neuromuscular data in the null set and the data from the user to be authenticated are similar).

In some embodiments, the ratio of target/non-target classification (e.g., the ratio that directs the proportion of estimates the model makes of whether a data set is from the user to be authenticated or not) may be tuned for a desired level of specificity and sensitivity of authentication (e.g., the false positive and false negative rates).

Figure 5A:
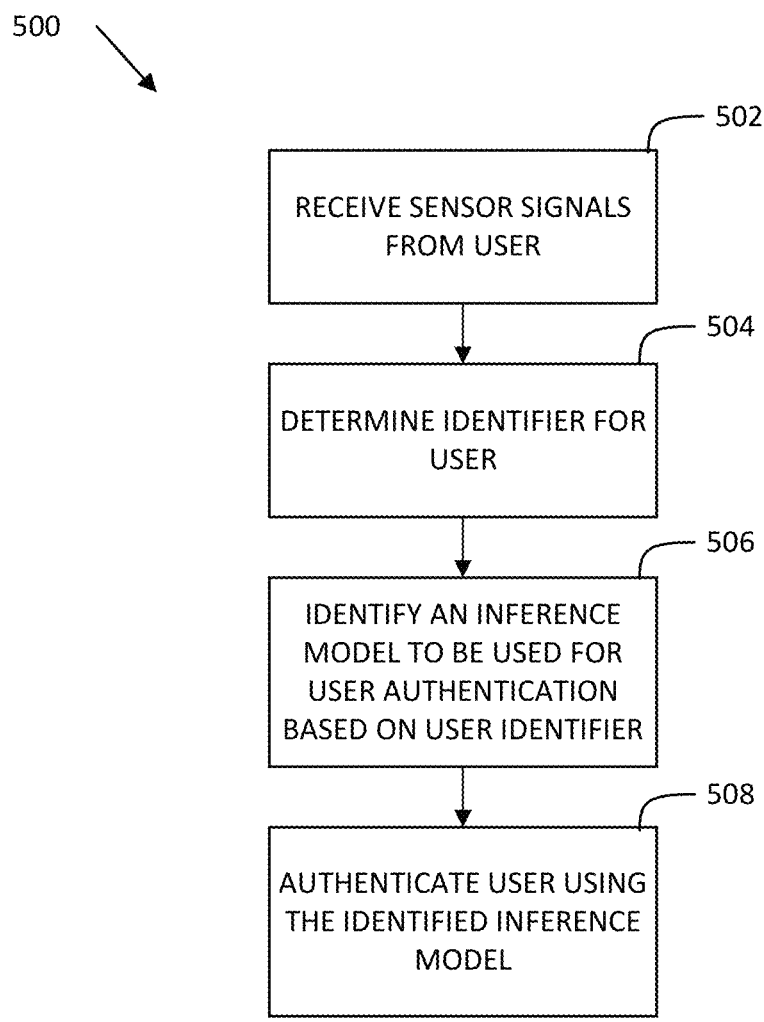
FIG. 5A is a flowchart of a process for authenticating a user based on sensor signals in accordance with some embodiments of the technology described herein.
Figure 7A:
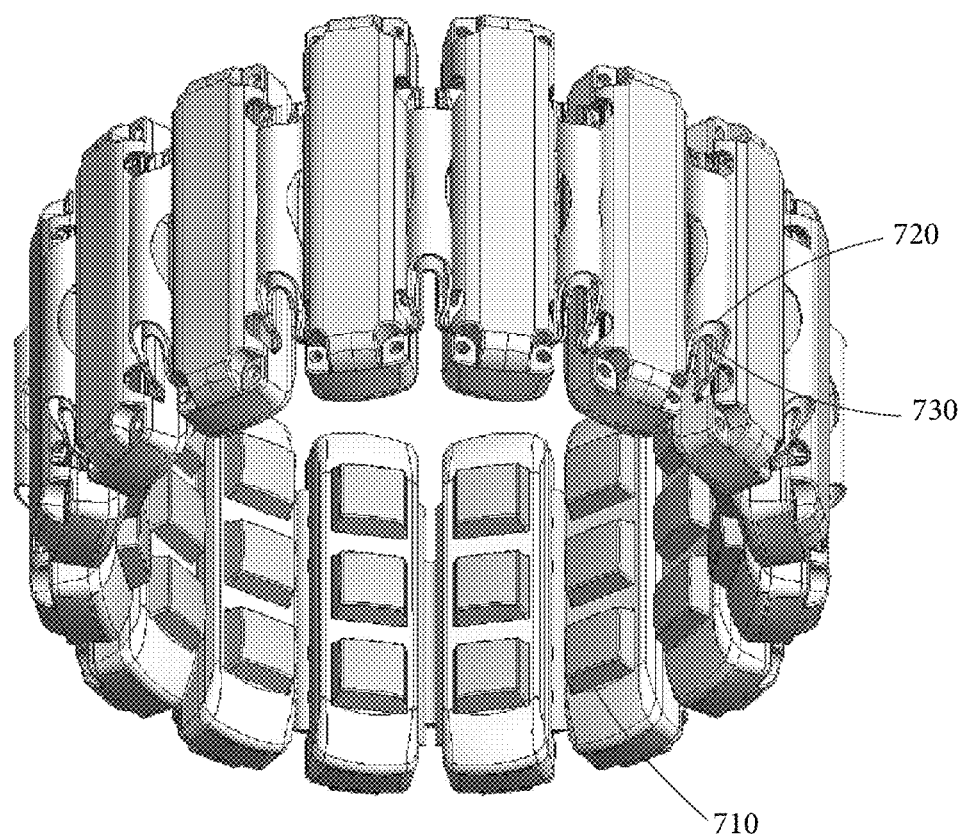
FIG. 7A illustrates a wearable system with sixteen EMG sensors arranged circumferentially around an elastic band configured to be worn around a user's lower arm or wrist, in accordance with some embodiments of the technology described herein.
Figure 7B:
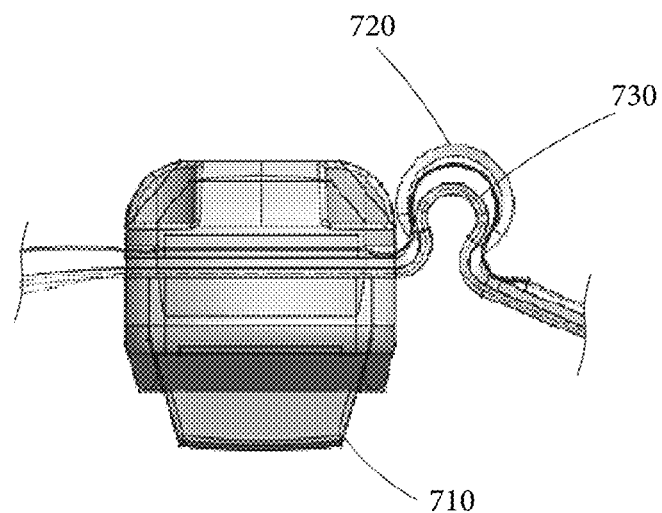
FIG. 7B is a cross-sectional view through one of the sixteen EMG sensors illustrated in FIG. 7A.

FIG. 5A illustrates a process 500 for identifying and/or authenticating a user based on recorded sensor signals in accordance with some embodiments. In act 502, sensor signals recorded by one or more sensors such as neuromuscular sensors (e.g., EMG sensors) and/or auxiliary sensors (e.g., IMU sensors, imaging devices, radiation detection devices, heart rate monitors, or any other type of biosensors) are received. For example, a user may be wearing a device (e.g., an armband or wristband) that includes a plurality of EMG sensors located thereon, which are configured to record EMG signals as the user performs movements of their arm and/or hand. An example of a wearable EMG device that may be used in accordance with some embodiments is shown in FIGS. 7A and 7B, described in more detail below.

Process 500 then proceeds to act 504, where an identifier for the user is determined. In some embodiments, the user identifier may be determined based, at least in part, on user input provided by the user (e.g., via a user interface). User input may be in the form of textual input (e.g., a typed username, user id, phrase, or other textual input), voice input (e.g., speech), biometric input (e.g., fingerprint, iris scan, etc.), some combination of the aforementioned types of input, and/or other form(s) of input. In some embodiments, the user may be prompted to provide a username or other identifier, for example, by typing a username in an authentication screen presented via a user interface. In some embodiments, the sensor signals received in act 502 may be recorded as the user provides the username or other identifier. In other embodiments, the sensor signals received in act 502 may be received after the user has provided the user input.

In some embodiments, the user identifier is determined without the need for the user to explicitly provide user input. For example, the user identifier may be determined based on the sensor signals received in act 502. In an example of such an implementation, the received sensor signals may be provided as input to multiple trained inference models, each of which is associated with a different user. The user identifier may be determined based on the output of the inference models when provided with the user's sensor data. For example, the output of each of the inference models may be a binary classification (e.g., the sensor signals likely belong to that user vs. all other users for which trained inference models exist), and a user identifier (e.g., username or other identifier) may be retrieved from a user profile associated with the inference model for which a positive output was obtained. Other user identification techniques based on an analysis of the received sensor data are also possible. In yet further embodiments, the user identifier is based, at least in part, on user input and the received sensor data. For example, the user may both speak their name and move their hand while sensor data is recorded. Both the recorded sensor data and the user input may be used to determine the user identifier.

Process 500 then proceeds to act 506, where an inference model to be used for user authentication is identified based on the user identifier. In one embodiment, identifying the inference model to be used for user authentication includes identifying the inference model based on an indication of the inference model stored in the user's profile.

Process 500 then proceeds to act 508, where the user is authenticated using the identified inference model. In some embodiments, neuromuscular signal data from the user may be provided as input to the inference model associated with the user identifier. The inference model may provide a binary classification output (e.g., yes or no) to determine whether the neuromuscular signal data belongs to the user associated with the user identifier. In response to an inference model output indicating that the neuromuscular signal data is from the user associated with the user identifier, the user may be authorized to access a secure system or perform a secure transaction.

In some embodiments, user authentication based on a neuromuscular signature may involve prompting a user to provide a username or other identifier to determine which inference model for authentication is to be used (e.g., the inference model for authentication associated with that username or other identifier). Neuromuscular signal data from the user may then be provided as input to the inference model associated with the username and provide a binary classification output (e.g., yes or no) to determine whether the neuromuscular signal data belongs to the user associated with the username or other identifier.

In some embodiments, user authentication and/or identification may involve providing the user's neuromuscular data to a plurality of inference models (e.g., associated with different users of the system) serially or in parallel. In these embodiments, the user may or may not be prompted to enter a username or other identifier. If none of the inference models authenticate the user based on the provided neuromuscular signal data, then the user is not authenticated and/or identified. Similarly, if two or more of the inference models authenticate the user based on the provided neuromuscular signal data (indicating at least one false positive), then the user would not be authenticated. If one inference model authenticates the user, then the user is authenticated and provided access to the secure system or granted permission to perform a secure transaction.

In some embodiments, if neuromuscular data from a user has previously been used to train an inference model for identification and/or authentication and subsequent neuromuscular data does not successfully identify and/or authenticate a user, the user may be prompted to confirm they have previously trained a model for user identification and/or authentication and, if so, be prompted to provide additional neuromuscular data to update or refine the inference model for authentication and/or identification.

Figure 5B:
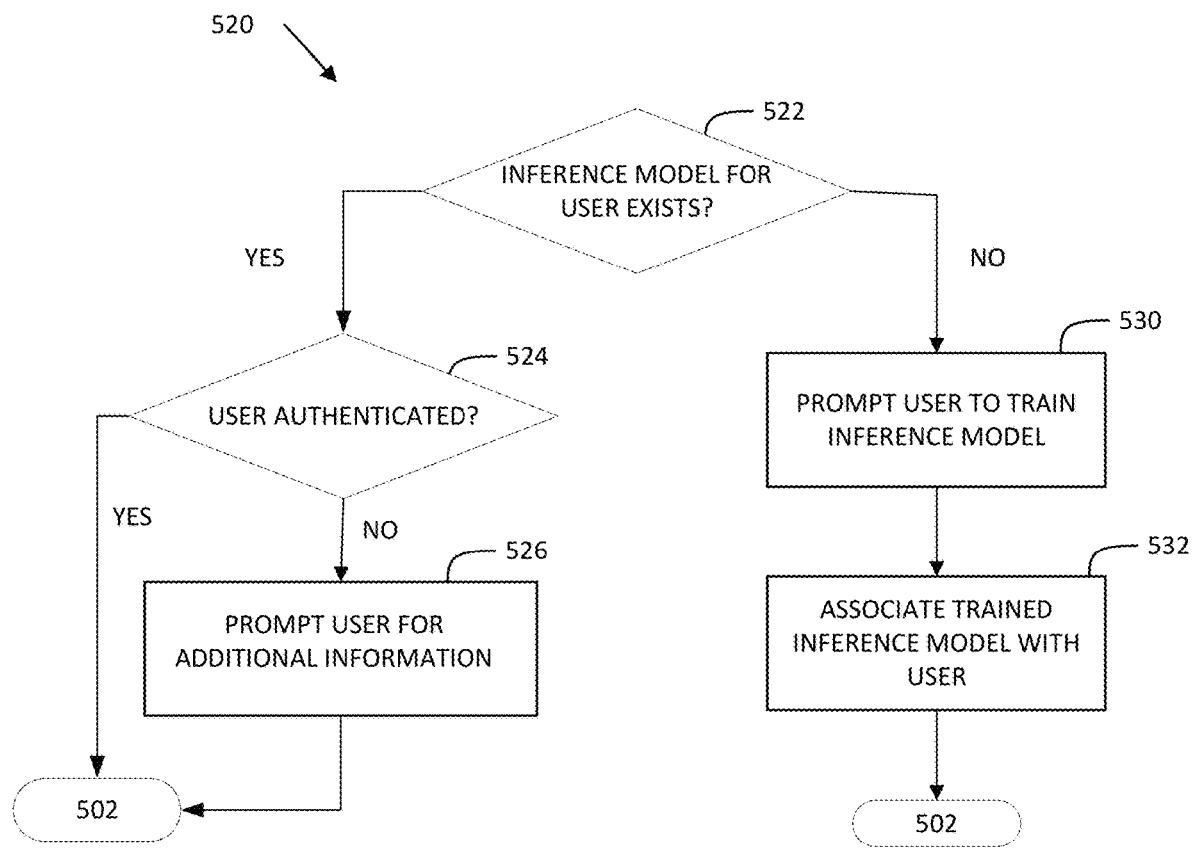
FIG. 5B is a flowchart of a process for determining an inference model to be used for user authentication in accordance with some embodiments of the technology described herein.

In some embodiments, identifying an inference model to be used for user authentication (in act 506) may include determining whether an inference model exists for the user or whether an inference model has been previously trained for the user. FIG. 5B describes a process 520 for determining an inference model to be used for user authentication, in accordance with some embodiments. In some embodiments, determining whether an inference model exists (or has been previously trained) for a user includes determining, based on an output of each of a plurality of stored inference models, a likelihood or probability that the inference model is associated with the user. In response to a determination that the user is associated with an inference model and/or a determination that a likelihood that an inference model is associated with the user is above a predetermined threshold, a determination may be made that an inference model exists (or has been previously trained) for the user. The existing (or previously trained) inference model may be then be used for user authentication (e.g., in act 508 of process 500).

When it is determined in act 522 that an inference model for the user exists, process 520 proceeds to act 524, where it is determined whether the user has been successfully authenticated (e.g., using any of the various embodiments described above or others). In response to a determination that the user has been successfully authenticated, the process may return to act 502 in process 500 to allow for continuous, intermittent, and/or regularly queried authentication. When it is determined in act 524 that the user has not been successfully authenticated (even though an inference model exists or has been previously trained for the user), the user may be prompted for further information in act 526. For example, the user may be prompted to confirm that a username or other identifier provided is accurate. In another example, the user may be prompted to confirm whether they have previously provided neuromuscular data to train an inference model for authentication and/or identification. If the user indicates that he/she has previously provided neuromuscular data to train an inference model for authentication and/or identification and the inference models for authentication are implemented on a local device, then the system may query a remote database (at a remote device) to determine whether an inference model for authentication for that user is available and, if so, process the neuromuscular signals remotely for user authentication and/or download the inference model for authentication of that user to the local device for implementation. If the user indicates that he/she has previously provided neuromuscular data to train an inference model for authentication and/or identification and a local and/or remote inference model for authentication of that user has not been used to successfully authenticate the user, the user may be prompted to provide additional neuromuscular signal data to further train/re-train the inference model.

In some instances, the user may not be successfully authenticated due to differences in the patterns of muscle activation produced by the user during authentication versus during the training period (e.g., when the user provided neuromuscular signal data for training the inference model for authentication). In some embodiments, any additional neuromuscular signal data provided by the user may be appended to previously provided neuromuscular signal data and used to further train the inference model for authentication and/or identification of the user. After the further training of the inference model is complete, the user may be optionally prompted to attempt authentication and/or identification again by returning to act 502 in process 500.

In some embodiments, in response to a determination that the user is not associated with an inference model and/or a determination that a likelihood that an inference model is associated with the user is below a predetermined threshold, it may be determined that an inference model for the user does not exist (or has not been previously trained). In these embodiments, process 520 proceeds to act 530, where the user is prompted to provide neuromuscular data to train an inference model for authentication and/or identification. In act 532, the trained inference model may be associated with the user, for example, by associating the trained inference model with a user identifier. After the training and associating of the inference model is complete, the user may be optionally prompted to attempt authentication and/or identification again by returning to act 502 in process 500.

The inventors have recognized that certain high security systems that do not require a user to provide a username or other identifier (e.g. by typing a username) for authentication would be advantageous. In general, user identification is a more challenging inference than user authentication because user identification requires at least as many model outputs as users who may be identified by the system. In contrast, user authentication is achieved with a system or method that provides neuromuscular signals (raw neuromuscular signals and/or processed neuromuscular signals) to a set of n inferential models, where n equals the number of users that may be authenticated, and the output is a binary classification of yes or no to the question: "Are the neuromuscular signals from User X?" Accordingly, the false positive rate of an inference model for user identification will generally be higher than the false positive rate of an inference model for user authentication, representing a reduction in security for systems that do not require a user to provide a username or other identifier. The inventors have recognized that a two-step user verification process may be implemented: in a first step, a system or method for user identification (as described herein) may be implemented. If a user of the secure system is identified, a second step is implemented in which the neuromuscular signals (raw neuromuscular signals and/or processed neuromuscular signals) from the identified user are provided to an inference model for that specific user for authentication that has a binary classification output and a low false positive rate.

In some embodiments, a user may execute a specific series of muscle activations associated with their neuromuscular signature. The inventors have recognized that certain secure systems may require a higher degree of security which may be achieved by training an inference model for user identification and/or authentication that comprises both the user's personal and characteristic pattern of neuromuscular activation and a specified sequence of muscle activation. For example, the user may execute a series of movements (e.g. a sequence of making a fist, pinching the middle finger and thumb, and abducting the hand in a flat position).

The inventors have recognized that personal and/or characteristic signals comprise spatiotemporal patterns of motor unit activation and may be recorded from any muscle or set of muscles. Various non-limiting examples of locations for neuromuscular recordings include: a wristwatch, armband, or other form factor with sensors to record neuromuscular signals from one or more muscles in the arm; a waistband, patch, or other form factor with sensors to record neuromuscular signals from one or more muscles in the abdomen and/or back; a band, patch, or other form factor with sensors to record neuromuscular signals from one or more muscles in leg; a sock, patch, orthotic, or other form factor with sensors to record neuromuscular signals from one or more muscles in the foot and ankle; a patch, mask, or other form factor with sensors to record neuromuscular signals from one or more muscles in the face; a neckband or other form factor with sensors to record neuromuscular signals from one or more muscles in the neck and/or vocal tract; and a form factor placed inside the mouth with sensors to record neuromuscular signals from one or more muscles in the tongue.

In some embodiments, prior to the system's use for authentication/identification, one or more components of the system (e.g., sensors 102, inference model(s) 104, etc.) may be calibrated. In some implementations, the one or more computer processors of the system 100 may be programmed to detect a particular configuration (e.g., position, orientation, etc.) of a wearable device on which the sensors 102 are arranged while the user is wearing the wearable device and/or may detect whether the sensors are in contact with the user's body. In some implementations, the system may prompt the user to change the configuration of the wearable device (e.g., using haptic feedback) in response to a determination that sensor signals recorded by the sensors in the particular configuration are not similar to sensor signals known to be associated with a desired configuration. In some embodiments, the system may prompt the user to change the configuration of the wearable device in response to a determination that the neuromuscular signature derived when the user is wearing the wearable device in the particular configuration does not match the neuromuscular signature for the user that is stored in the memory device during the training period. In some embodiments, the system may prompt the user to change the configuration of the wearable device in response to a determination that the sensor signals being recorded are not associated with neuromuscular structures of interest.

Figure 4:
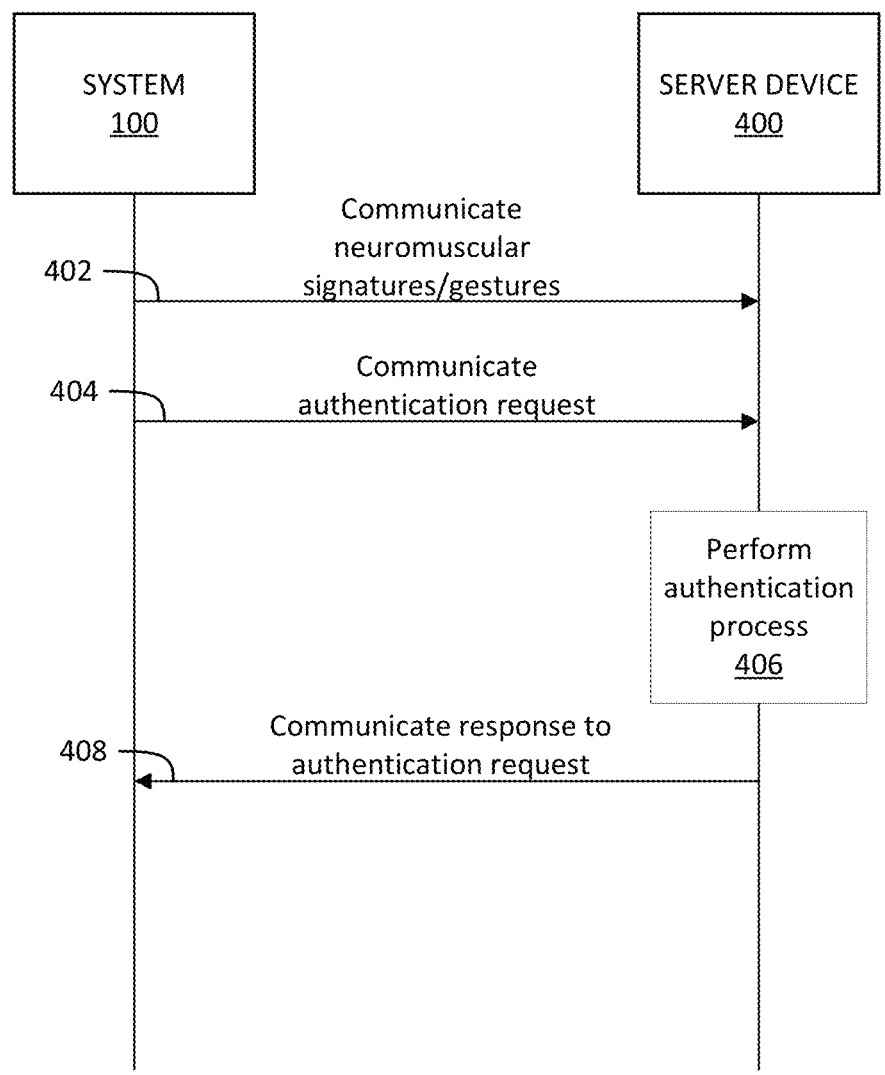
FIG. 4 shows illustrative communications between the computer-based system of FIG. 1 and a server device in accordance with some embodiments of the technology described herein.

In some implementations, system 100 may be configured to communicate with a server device 400, as shown in FIG. 4. One or more computer processors of system 100 may be configured to communicate the derived neuromuscular signatures and/or associated gestures to the server device 400 via the at least one network. In some implementations, at act 402, information associated with the user's neuromuscular signatures and/or gestures obtained during the training period may be communicated and stored at the server device. When a user performs a certain gesture, the one or more computer processors of system 100 may communicate to the server device 400, a request to authenticate the user at act 404. The request may include the gesture and/or the currently derived neuromuscular signature. One or more computer processors of the server device 400 may be programmed to perform the authentication process, at act 406, by comparing the received information with previously stored signatures/gestures associated with the user. At act 408, the server device may communicate a response to the authentication request back to the one or more computer processors of system 100 indicating whether or not the user is an authorized user.

According to some embodiments, the server device may store neuromuscular signatures associated with a plurality of users. The server device may also store identifying information associated with each of the users, such as, name, address, date of birth, and the like. In some implementations, the server device may store the neuromuscular signature and the identifying information associated with each user in a table, database, or other data storage structure. It will be appreciated that the neuromuscular signature and the identifying information associated with a user may be stored in any manner as long as the two pieces of information are linked as being associated with the same user. Other information may be stored and linked to the same user, such as, gesture information and/or a confidence level associated with the signature.

In some implementations, in a manner similar to communication of the authentication request described above, the one or more computer processors of system 100 may communicate, to the server device 400, a request to identify a particular user from among the plurality of users. The request may include a currently derived neuromuscular signature associated with the particular user. One or more computer processors of the server device 400 may be programmed to perform the identification process by comparing the received neuromuscular signature against the neuromuscular signatures stored at the server device to determine whether the received neuromuscular signature matches any of the stored neuromuscular signatures. In response to a match, the server device 400 may retrieve the identifying information associated with the matching signature and communicate a response to the identification request back to the one or more computer processors of system 100 with the identifying information that identifies the user.

In some embodiments, the system 100 may be configured to encrypt the neuromuscular signatures and/or associated gestures prior to transmission to the server device 400. In these embodiments, the server device 400 may decrypt the received information prior to performing the authentication and/or identification process.

The inventors have recognized that when the user initially starts using the system 100 for authentication and/or identification purposes, a confidence level associated with an initial neuromuscular signature derived for the user may be lower than a confidence level of a subsequent neuromuscular signature that is derived after the user has been using the system 100 for some time. The inventors have further recognized that supplemental authentication factors may be needed to authenticate the user at least until the confidence level associated with the derived neuromuscular signature is above a predetermined threshold in order to ensure that the authentication process is accurate.

According to some embodiments, the one or more computer processors of system 100 may be programmed to determine a first confidence level associated with a derived neuromuscular signature. When the first confidence level is below a first predetermined threshold, the one or more computer processors are programmed to authenticate the user based on the derived neuromuscular signature and one or more supplemental authentication factors. For example, when the user attempts to log in to an account, the user may be prompted to perform a particular gesture. In response to a determination that a confidence level of the neuromuscular signature associated with the gesture is below the first predetermined threshold, the user may be prompted to enter a password and answer one or more security questions.

In some embodiments, the one or more computer processors of system 100 may be programmed to determine a second confidence level associated with a derived neuromuscular signature. For example, the second confidence level associated with the derived neuromuscular signature may be higher than the first confidence level after the user has been using the system for some time. When the second confidence level is more than the first confidence level, the one or more computer processors are programmed to authenticate the user based on the derived neuromuscular signature and a reduced number of supplemental authentication factors. For example, when the user attempts to log in to an account, the user may be prompted to perform a particular gesture and/or perform a set of free-form movements. In response to a determination that a confidence level of the neuromuscular signature associated with the gesture is more than the first confidence level, the user may be prompted to enter only the password and may not be prompted to answer the security questions.

In some embodiments, when the second confidence level associated with the derived neuromuscular signature exceeds the second predetermined threshold, the one or more computer processors are programmed to authenticate the user based on only the derived neuromuscular signature. In other words, the confidence level associated with the derived neuromuscular signature may be determined to be high enough such that the system 100 need not reply on supplemental authentication factors to authenticate the user.

Figure 6:
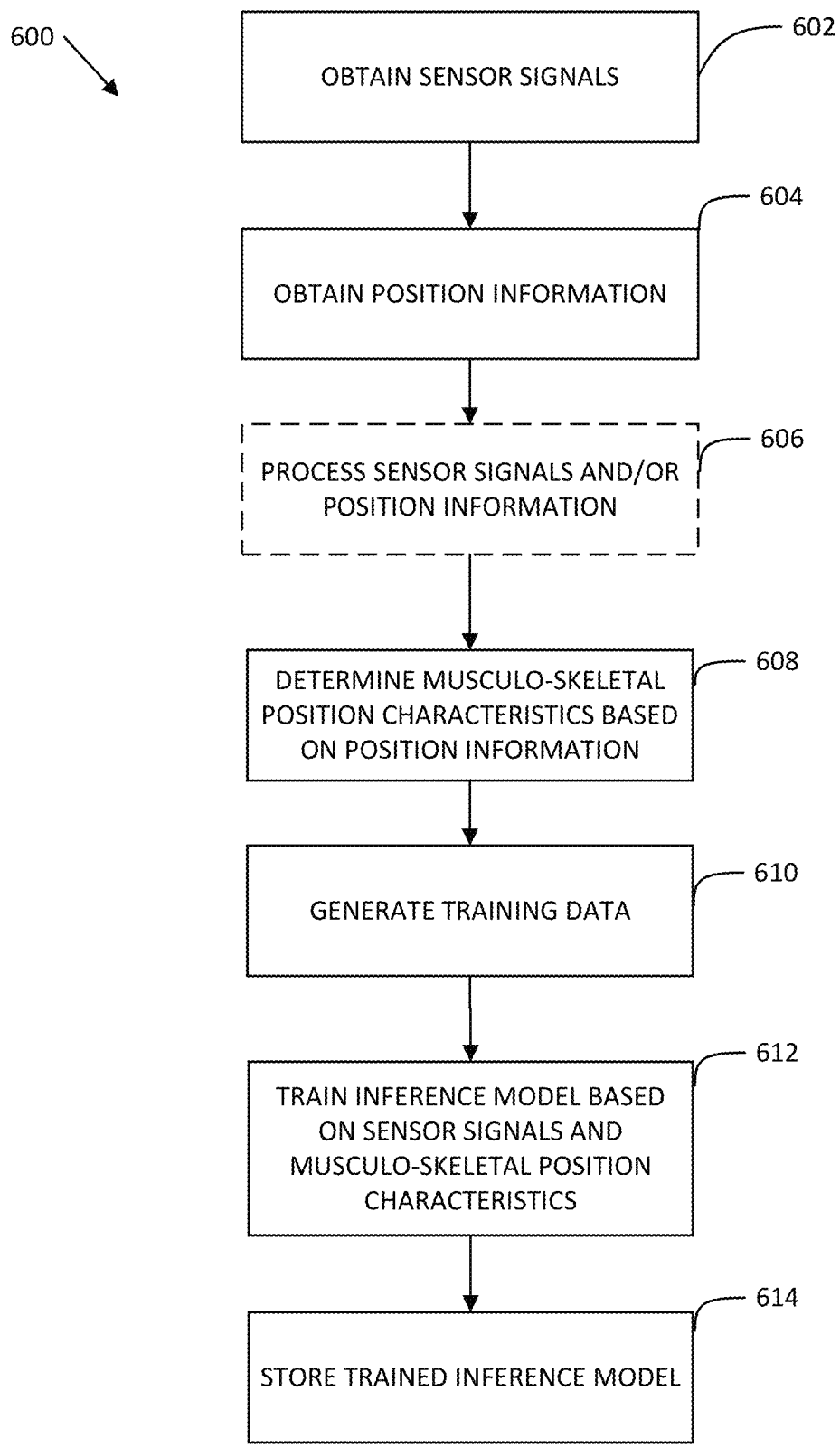
FIG. 6 is a flowchart of a process for generating a statistical model for predicting musculoskeletal position information using signals recorded from sensors, in accordance with some embodiments of the technology described herein.

FIG. 6 describes a process 600 for generating (sometimes referred to herein as "training") an inference model using signals recorded from sensors 102. Process 600 may be executed by any suitable computing device(s), as aspects of the technology described herein are not limited in this respect. For example, process 600 may be executed by one or more computer processors described with reference to FIGS. 8A and 8B. As another example, one or more acts of process 600 may be executed using one or more servers (e.g., servers included as a part of a cloud computing environment). For example, at least a portion of act 610 relating to training of an inference model (e.g., a neural network) may be performed using a cloud computing environment.

Process 600 begins at act 602, where a plurality of sensor signals are obtained for one or multiple users performing one or more movements (e.g., typing on a keyboard). In some embodiments, the plurality of sensor signals may be recorded as part of process 600. In other embodiments, the plurality of sensor signals may have been recorded prior to the performance of process 600 and are accessed (rather than recorded) at act 602.

In some embodiments, the plurality of sensor signals may include sensor signals recorded for a single user performing a single movement or multiple movements. The user may be instructed to perform a sequence of movements for a particular task (e.g., opening a door) and sensor signals corresponding to the user's movements may be recorded as the user performs the task he/she was instructed to perform. The sensor signals may be recorded by any suitable number of sensors located in any suitable location(s) to detect the user's movements that are relevant to the task performed. For example, after a user is instructed to perform a task with the fingers of his/her right hand, the sensor signals may be recorded by multiple neuromuscular sensors circumferentially (or otherwise) arranged around the user's lower right arm to detect muscle activity in the lower right arm that give rise to the right hand movements and one or more IMU sensors arranged to predict the joint angle of the user's arm relative to the user's torso. As another example, after a user is instructed to perform a task with his/her leg (e.g., to kick an object), sensor signals may be recorded by multiple neuromuscular sensors circumferentially (or otherwise) arranged around the user's leg to detect muscle activity in the leg that give rise to the movements of the foot and one or more IMU sensors arranged to predict the joint angle of the user's leg relative to the user's torso.

In some embodiments, the sensor signals obtained in act 502 correspond to signals from one type of sensor (e.g., one or more IMU sensors or one or more neuromuscular sensors) and an inference model may be trained based on the sensor signals recorded using the particular type of sensor, resulting in a sensor-type specific trained inference model. For example, the obtained sensor signals may comprise a plurality of EMG sensor signals arranged around the lower arm or wrist of a user and the inference model may be trained to predict musculoskeletal position information for movements of the wrist and/or hand during performance of a task such as grasping and twisting an object such as a doorknob.

In embodiments that provide predictions based on multiple types of sensors (e.g., IMU sensors, EMG sensors, MMG sensors, SMG sensors), a separate inference model may be trained for each of the types of sensors and the outputs of the sensor-type specific models may be combined to generate a musculoskeletal representation of the user's body. In other embodiments, the sensor signals obtained in act 602 from two or more different types of sensors may be provided to a single inference model that is trained based on the signals recorded from the different types of sensors. In one illustrative implementation, an IMU sensor and a plurality of EMG sensors are arranged on a wearable device configured to be worn around the forearm of a user, and signals recorded by the IMU and EMG sensors are collectively provided as inputs to an inference model, as discussed in more detail below.

In some embodiments, the sensor signals obtained in act 602 are recorded at multiple time points as a user performs one or multiple movements. As a result, the recorded signal for each sensor may include data obtained at each of multiple time points. Assuming that n sensors are arranged to simultaneously measure the user's movement information during performance of a task, the recorded sensor signals for the user may comprise a time series of K n-dimensional vectors $\{x_k | 1 \le k \le K\}$ at time points $t_1, t_2, \ldots, t_K$ during performance of the movements.

In some embodiments, a user may be instructed to perform a task multiple times and the sensor signals and position information may be recorded for each of multiple repetitions of the task by the user. In some embodiments, the plurality of sensor signals may include signals recorded for multiple users, each of the multiple users performing the same task one or more times. Each of the multiple users may be instructed to perform the task and sensor signals and position information corresponding to that user's movements may be recorded as the user performs (once or repeatedly) the task he/she was instructed to perform. When sensor signals are collected by multiple users which are combined to generate an inference model, an assumption is that different users employ similar musculoskeletal positions to perform the same movements. Collecting sensor signals and position information from a single user performing the same task repeatedly and/or from multiple users performing the same task one or multiple times facilitates the collection of sufficient training data to generate an inference model that can accurately predict musculoskeletal position information associated with performance of the task.

In some embodiments, a user-independent inference model may be generated based on training data corresponding to the recorded signals from multiple users, and as the system is used by a user, the inference model is trained based on recorded sensor data such that the inference model learns the user-dependent characteristics to refine the prediction capabilities of the system for the particular user.

In some embodiments, the plurality of sensor signals may include signals recorded for a user (or each of multiple users) performing each of multiple tasks one or multiple times. For example, a user may be instructed to perform each of multiple tasks (e.g., grasping an object, pushing an object, and pulling open a door) and signals corresponding to the user's movements may be recorded as the user performs each of the multiple tasks he/she was instructed to perform. Collecting such data may facilitate developing an inference model for predicting musculoskeletal position information associated with multiple different actions that may be taken by the user. For example, training data that incorporates musculoskeletal position information for multiple actions may facilitate generating an inference model for predicting which of multiple possible movements a user may be performing.

As discussed above, the sensor data obtained at act 602 may be obtained by recording sensor signals as each of one or multiple users performs each of one or more tasks one or more multiple times. As the user(s) perform the task(s), position information describing the spatial position of different body segments during performance of the task(s) may be obtained in act 604. In some embodiments, the position information is obtained using one or more external devices or systems that track the position of different points on the body during performance of a task. For example, a motion capture system, a laser scanner, a device to measure mutual magnetic induction, or some other system configured to capture position information may be used. As one non-limiting example, a plurality of position sensors may be placed on segments of the fingers of the right hand and a motion capture system may be used to determine the spatial location of each of the position sensors as the user performs a task such as grasping an object. The sensor data obtained at act 502 may be recorded simultaneously with recording of the position information obtained in act 504. In this example, position information indicating the position of each finger segment over time as the grasping motion is performed is obtained.

Next, process 600 proceeds to act 606, where the sensor signals obtained in act 602 and/or the position information obtained in act 604 are optionally processed. For example, the sensor signals or the position information signals may be processed using amplification, filtering, rectification, or other types of signal processing.

Next, process 600 proceeds to act 608, where musculoskeletal position characteristics are determined based on the position information (as collected in act 604 or as processed in act 606). In some embodiments, rather than using recorded spatial (e.g., x, y, z) coordinates corresponding to the position sensors as training data to train the inference model, a set of derived musculoskeletal position characteristic values are determined based on the recorded position information, and the derived values are used as training data for training the inference model. For example, using information about the constraints between connected pairs of rigid segments in the articulated rigid body model, the position information may be used to determine joint angles that define angles between each connected pair of rigid segments at each of multiple time points during performance of a task. Accordingly, the position information obtained in act 604 may be represented by a vector of n joint angles at each of a plurality of time points, where n is the number of joints or connections between segments in the articulated rigid body model.

Next, process 600 proceeds to act 610, where the time series information obtained at acts 602 and 608 is combined to create training data used for training an inference model at act 610. The obtained data may be combined in any suitable way. In some embodiments, each of the sensor signals obtained at act 602 may be associated with a task or movement within a task corresponding to the musculoskeletal position characteristics (e.g., joint angles) determined based on the positional information recorded in act 604 as the user performed the task or movement. In this way, the sensor signals may be associated with musculoskeletal position characteristics (e.g., joint angles) and the inference model may be trained to predict that the musculoskeletal representation will be characterized by particular musculoskeletal position characteristics between different body segments when particular sensor signals are recorded during performance of a particular task.

In embodiments comprising sensors of different types (e.g., IMU sensors and neuromuscular sensors) configured to simultaneously record different types of movement information during performance of a task, the sensor data for the different types of sensors may be recorded using the same or different sampling rates. When the sensor data is recorded at different sampling rates, at least some of the sensor data may be resampled (e.g., up-sampled or down-sampled) such that all sensor data provided as input to the inference model corresponds to time series data at the same time resolution. Resampling at least some of the sensor data may be performed in any suitable way including, but not limited to using interpolation for upsampling and using decimation for downsampling.

In addition to or as an alternative to resampling at least some of the sensor data when recorded at different sampling rates, some embodiments employ an inference model configured to accept multiple inputs asynchronously. For example, the inference model may be configured to model the distribution of the "missing" values in the input data having a lower sampling rate. Alternatively, the timing of training of the inference model may occur asynchronously as input from multiple sensor data measurements becomes available as training data.

Next, process 600 proceeds to act 612, where an inference model for predicting musculoskeletal position information is trained using the training data generated at act 610. The inference model being trained may take as input a sequence of data sets each of the data sets in the sequence comprising an n-dimensional vector of sensor data. The inference model may provide output that indicates, for each of one or more tasks or movements that may be performed by a user, the likelihood that the musculoskeletal representation of the user's body will be characterized by a set of musculoskeletal position characteristics (e.g., a set of joint angles between segments in an articulated multi-segment body model). For example, the inference model may take as input a sequence of vectors $\{x_k | 1 \leq k \leq K\}$ generated using measurements obtained at time points $t_1, t_2, t_K$, where the ith component of vector $x_j$ is a value measured by the ith sensor at time $t_j$ and/or derived from the value measured by the ith sensor at time $t_j$. In another non-limiting example, a derived value provided as input to the inference model may comprise features extracted from the data from all or a subset of the sensors at and/or prior to time $t_j$ (e.g., a covariance matrix, a power spectrum, a combination thereof, or any other suitable derived representation). Based on such input, the inference model may provide output indicating, a probability that a musculoskeletal representation of the user's body will be characterized by a set of musculoskeletal position characteristics. As one non-limiting example, the inference model may be trained to predict a set of joint angles for segments in the fingers in the hand over time as a user grasps an object. In this example, the trained inference model may output, a set of predicted joint angles for joints in the hand corresponding to the sensor input.

In some embodiments, the inference model may be a neural network and, for example, may be a recurrent neural network. In some embodiments, the recurrent neural network may be a long short-term memory (LSTM) neural network. It should be appreciated, however, that the recurrent neural network is not limited to being an LSTM neural network and may have any other suitable architecture. For example, in some embodiments, the recurrent neural network may be a fully recurrent neural network, a recursive neural network, a variational autoencoder, a Hopfield neural network, an associative memory neural network, an Elman neural network, a Jordan neural network, an echo state neural network, a second order recurrent neural network, and/or any other suitable type of recurrent neural network. In other embodiments, neural networks that are not recurrent neural networks may be used. For example, deep neural networks, convolutional neural networks, and/or feedforward neural networks, may be used.

In some of the embodiments in which the inference model is a neural network, the output layer of the neural network may provide a set of output values corresponding to a respective set of possible musculoskeletal position characteristics (e.g., joint angles). In this way, the neural network may operate as a non-linear regression model configured to predict musculoskeletal position characteristics from raw or pre-processed sensor measurements. It should be appreciated that, in some embodiments, any other suitable non-linear regression model may be used instead of a neural network, as aspects of the technology described herein are not limited in this respect.

In some embodiments, the neural network can be implemented based on a variety of topologies and/or architectures including deep neural networks with fully connected (dense) layers, Long Short-Term Memory (LSTM) layers, convolutional layers, Temporal Convolutional Layers (TCL), or other suitable type of deep neural network topology and/or architecture. The neural network can have different types of output layers including output layers with logistic sigmoid activation functions, hyperbolic tangent activation functions, linear units, rectified linear units, or other suitable type of nonlinear unit. Likewise, the neural network can be configured to represent the probability distribution over n different classes via, for example, a softmax function or include an output layer that provides a parameterized distribution e.g., mean and variance of a Gaussian distribution.

It should be appreciated that aspects of the technology described herein are not limited to using neural networks, as other types of inference models may be employed in some embodiments. For example, in some embodiments, the inference model may comprise a hidden Markov model, a Markov switching model with the switching allowing for toggling among different dynamic systems, dynamic Bayesian networks, and/or any other suitable graphical model having a temporal component. Any such inference model may be trained at act 512 using the sensor data obtained at act 502.

As another example, in some embodiments, the inference model may take as input, features derived from the sensor data obtained at act 602. In such embodiments, the inference model may be trained at act 612 using features extracted from the sensor data obtained at act 602. The inference model may be a support vector machine, a Gaussian mixture model, a regression based classifier, a decision tree classifier, a Bayesian classifier, and/or any other suitable classifier, as aspects of the technology described herein are not limited in this respect. Input features to be provided as training data to the inference model may be derived from the sensor data obtained at act 602 in any suitable way. For example, the sensor data may be analyzed as time series data using wavelet analysis techniques (e.g., continuous wavelet transform, discrete-time wavelet transform, etc.), Fourier-analytic techniques (e.g., short-time Fourier transform, Fourier transform, etc.), and/or any other suitable type of time-frequency analysis technique. As one non-limiting example, the sensor data may be transformed using a wavelet transform and the resulting wavelet coefficients may be provided as inputs to the inference model.

In some embodiments, at act 612, values for parameters of the inference model may be estimated from the training data generated at act 610. For example, when the inference model is a neural network, parameters of the neural network (e.g., weights) may be estimated from the training data. In some embodiments, parameters of the inference model may be estimated using gradient descent, stochastic gradient descent, and/or any other suitable iterative optimization technique. In embodiments where the inference model is a recurrent neural network (e.g., an LSTM), the inference model may be trained using stochastic gradient descent and backpropagation through time. The training may employ a cross-entropy loss function and/or any other suitable loss function, as aspects of the technology described herein are not limited in this respect.

Next, process 600 proceeds to act 614, where the trained inference model is stored (e.g., in datastore—not shown). The trained inference model may be stored using any suitable format, as aspects of the technology described herein are not limited in this respect. In this way, the inference model generated during execution of process 500 may be used at a later time, for example, to predict musculoskeletal position information (e.g., joint angles) for a given set of input sensor data, as described below.

In some embodiments, sensor signals are recorded from a plurality of sensors (e.g., arranged on or near the surface of a user's body) that record activity associated with movements of the body during performance of a task. The recorded signals may be optionally processed and provided as input to an inference model trained using one or more techniques described above in connection with FIG. 6. In some embodiments that continuously record signals, the continuously recorded signals (raw or processed) may be continuously or periodically provided as input to the trained inference model for prediction of musculoskeletal position information (e.g., joint angles) for the given set of input sensor data. As discussed above, in some embodiments, the trained inference model is a user-independent model trained based on sensor and position information measurements from a plurality of users. In other embodiments, the trained model is a user-dependent model trained on data recorded from the individual user from which the data associated with the sensor signals is also acquired.

After the trained inference model receives the sensor data as a set of input parameters, the predicted musculoskeletal position information is output from the trained inference model. As discussed above, in some embodiments, the predicted musculoskeletal position information may comprise a set of musculoskeletal position information values (e.g., a set of joint angles) for a multi-segment articulated rigid body model representing at least a portion of the user's body. In other embodiments, the musculoskeletal position information may comprise a set of probabilities that the user is performing one or more movements from a set of possible movements.

In some embodiments, after musculoskeletal position information is predicted, a computer-based musculoskeletal representation of the user's body is generated based, at least in part, on the musculoskeletal position information output from the trained inference model. The computer-based musculoskeletal representation may be generated in any suitable way. For example, a computer-based musculoskeletal model of the human body may include multiple rigid body segments, each of which corresponds to one or more skeletal structures in the body. For example, the upper arm may be represented by a first rigid body segment, the lower arm may be represented by a second rigid body segment the palm of the hand may be represented by a third rigid body segment, and each of the fingers on the hand may be represented by at least one rigid body segment (e.g., at least fourth-eighth rigid body segments). A set of joint angles between connected rigid body segments in the musculoskeletal model may define the orientation of each of the connected rigid body segments relative to each other and a reference frame, such as the torso of the body. As new sensor data is measured and processed by the inference model to provide new predictions of the musculoskeletal position information (e.g., an updated set of joint angles), the computer-based musculoskeletal representation of the user's body may be updated based on the updated set of joint angles determined based on the output of the inference model. In this way the computer-based musculoskeletal representation is dynamically updated in real-time as sensor data is continuously recorded.

The computer-based musculoskeletal representation may be represented and stored in any suitable way, as embodiments of the technology described herein are not limited with regard to the particular manner in which the representation is stored. Additionally, although referred to herein as a "musculoskeletal" representation, to reflect that muscle activity may be associated with the representation in some embodiments, as discussed in more detail below, it should be appreciated that some musculoskeletal representations used in accordance with some embodiments may correspond to skeletal structures, muscular structures or a combination of skeletal structures and muscular structures in the body.

In some embodiments, direct measurement of neuromuscular activity and/or muscle activity underlying the user's movements may be combined with the generated musculoskeletal representation. Measurements from a plurality of sensors placed at locations on a user's body may be used to create a unified representation of muscle recruitment by superimposing the measurements onto a dynamically-posed skeleton. In some embodiments, muscle activity sensed by neuromuscular sensors and/or information derived from the muscle activity (e.g., force information) may be combined with the computer-generated musculoskeletal representation in real time.

FIG. 7A illustrates a wearable system with sixteen neuromuscular sensors 710 (e.g., EMG sensors) arranged circumferentially around an elastic band 720 configured to be worn around a user's lower arm or wrist. As shown, EMG sensors 710 are arranged circumferentially around elastic band 720. It should be appreciated that any suitable number of neuromuscular sensors may be used. The number and arrangement of neuromuscular sensors may depend on the particular application for which the wearable device is used. For example, a wearable armband or wristband can be used to generate control information for controlling an augmented reality system, a robot, controlling a vehicle, scrolling through text, controlling a virtual avatar, or any other suitable control task.

In some embodiments, sensors 710 include a set of neuromuscular sensors (e.g., EMG sensors). In other embodiments, sensors 710 can include a set of neuromuscular sensors and at least one "auxiliary" sensor configured to continuously record auxiliary signals. Examples of auxiliary sensors include, but are not limited to, other sensors such as IMU sensors, microphones, imaging sensors (e.g., a camera), radiation based sensors for use with a radiation-generation device (e.g., a laser-scanning device), or other types of sensors such as a heart-rate monitor. As shown the sensors 710 may be coupled together using flexible electronics 730 incorporated into the wearable device. FIG. 7B illustrates a cross-sectional view through one of the sensors 710 of the wearable device shown in FIG. 7A.

In some embodiments, the output of one or more of the sensing components can be optionally processed using hardware signal processing circuitry (e.g., to perform amplification, filtering, and/or rectification). In other embodiments, at least some signal processing of the output of the sensing components can be performed in software. Thus, signal processing of signals sampled by the sensors can be performed in hardware, software, or by any suitable combination of hardware and software, as aspects of the technology described herein are not limited in this respect. A non-limiting example of a signal processing chain used to process recorded data from sensors 710 are discussed in more detail below in connection with FIGS. 8A and 8B.

FIGS. 8A and 8B illustrate a schematic diagram with internal components of a wearable system with sixteen EMG sensors, in accordance with some embodiments of the technology described herein. As shown, the wearable system includes a wearable portion 810 (FIG. 8A) and a dongle portion 820 (FIG. 8B) in communication with the wearable portion 810 (e.g., via Bluetooth or another suitable short range wireless communication technology). As shown in FIG. 8A, the wearable portion 810 includes the sensors 710, examples of which are described in connection with FIGS. 7A and 7B. The output of the sensors 710 is provided to analog front end 830 configured to perform analog processing (e.g., noise reduction, filtering, etc.) on the recorded signals. The processed analog signals are then provided to analog-to-digital converter 832, which converts the analog signals to digital signals that can be processed by one or more computer processors. An example of a computer processor that may be used in accordance with some embodiments is microcontroller (MCU) 834 illustrated in FIG. 8A. As shown, MCU 834 may also include inputs from other sensors (e.g., IMU sensor 840), and power and battery module 842. The output of the processing performed by MCU may be provided to antenna 850 for transmission to dongle portion 820 shown in FIG. 8B.

Dongle portion 820 includes antenna 852 configured to communicate with antenna 850 included as part of wearable portion 810. Communication between antenna 850 and 852 may occur using any suitable wireless technology and protocol, non-limiting examples of which include radiofrequency signaling and Bluetooth. As shown, the signals received by antenna 852 of dongle portion 820 may be provided to a host computer for further processing, display, and/or for effecting control of a particular physical or virtual object or objects.

Although the examples provided with reference to FIGS. 7A, 7B and FIGS. 8A, 8B are discussed in the context of interfaces with EMG sensors, it is understood that the techniques described herein for reducing electromagnetic interference can also be implemented in wearable interfaces with other types of sensors including, but not limited to, mechanomyography (MMG) sensors, sonomyography (SMG) sensors, and electrical impedance tomography (EIT) sensors.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that one implementation of the embodiments of the present invention comprises at least one non-transitory computer-readable storage medium (e.g., a computer memory, a portable memory, a compact disk, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A computerized system comprising:
   one or more neuromuscular sensors configured to obtain one or more neuromuscular signals from a user;
   a memory storing an inference model and a neuromuscular signature associated with the user, wherein:
     the inference model is trained to:
       take, as input, the one or more neuromuscular signals and/or information based on the one or more neuromuscular signals; and
       output information indicative of motor unit activation(s) of the user; and
     the stored neuromuscular signature is associated with a first computer-estimated pattern of motor-unit activations derived, using the inference model, from first neuromuscular signals obtained from the user while the user performs a first set of gestures; and
   at least one computer processor programmed to:
     receive second neuromuscular signals obtained from the user while the user performs a second set of gestures;
     use the inference model to identify a second computer-estimated pattern of motor-unit activations from the second neuromuscular signals;
     determine whether the second computer-estimated pattern of motor-unit activations substantially matches the stored neuromuscular signature; and
     authenticate the user in accordance with a determination that the second computer-estimated pattern of motor-unit activations substantially matches the stored neuromuscular signature.

2. The computerized system of claim 1, wherein:
   the inference model is trained to output computer-estimated states of one or more motor units of the user; and
   the second computer-estimated pattern of motor-unit activations comprises a computer-estimated recruitment pattern of the one or more motor units corresponding to the second neuromuscular signals.

3. The computerized system of claim 2, wherein the computer-estimated recruitment pattern comprises a modulation of a computer-estimated firing rate of the one or more motor units.

4. The computerized system of claim 2, wherein the computer-estimated recruitment pattern comprises a modulation to a first computer-estimated firing rate of a first portion of the one or more motor units that occurs while a second computer-estimated firing rate of a second portion of the one or more motor units is substantially unmodulated.

5. The computerized system of claim 2, wherein the computer-estimated recruitment pattern comprises a computer-estimated motor-unit-action-potential waveform of the one or more motor units.

6. The computerized system of claim 2, wherein the computer-estimated recruitment pattern comprises a timing of computer-estimated motor unit action potentials of the one or more motor units.

7. The computerized system of claim 1, wherein:
   the at least one computer processor is further programmed to store, in the memory, the information indicative of motor unit activation(s) as computer-estimated states of a musculoskeletal representation of the user;
   the musculoskeletal representation includes rigid body segments connected by joints, each of the rigid body segments corresponding to one or more skeletal structures in the user's body; and
   the first computer-estimated pattern of motor-unit activations and the second computer-estimated pattern of motor-unit activations are derived from the computer-estimated states of the musculoskeletal representation stored in the memory.

8. The computerized system of claim 7, wherein the second computer-estimated pattern of motor-unit activations is derived from a spatiotemporal pattern of computer-estimated positional relationships between the rigid body segments.

9. The computerized system of claim 7, wherein the second computer-estimated pattern of motor-unit activations is derived from a spatiotemporal pattern of computer-estimated force relationships between the rigid body segments.

10. The computerized system of claim 7, wherein the second computer-estimated pattern of motor-unit activations is derived from a computer-estimated recruitment pattern of motor units corresponding to the rigid body segments.

11. The computerized system of claim 7, wherein identifying the second computer-estimated pattern of motor-unit activations comprises:
    providing, as input to the inference model, the second neuromuscular signals and/or information based on the second neuromuscular signals;
    providing, as a constraint used by the inference model, a prior state of the musculoskeletal representation, wherein the prior state of the musculoskeletal representation limits probabilities of possible subsequent states of the musculoskeletal representation;
    receiving, as an output of the inference model, one or more additional states of the musculoskeletal representation corresponding to the second neuromuscular signals; and
    deriving the second computer-estimated pattern of motor-unit activations from the one or more additional states.

12. A method for authenticating a user based on one or more neuromuscular signals, the method comprising:
obtaining, using one or more neuromuscular sensors arranged on one or more wearable devices, the one or more neuromuscular signals from the user;
identifying an inference model trained to:
take, as input, the one or more neuromuscular signals and/or information based on the one or more neuromuscular signals; and
output information indicative of motor unit activation(s) of the user; and
identifying a neuromuscular signature associated with a first computer-estimated pattern of motor-unit activations derived from first neuromuscular signals obtained from the user while the user performs a first set of gestures;
receiving second neuromuscular signals obtained from the user while the user performs a second set of gestures;
using the inference model to identify a second computer-estimated pattern of motor-unit activations from the second neuromuscular signals;
determining whether the second computer-estimated pattern of motor-unit activations substantially matches the stored neuromuscular signature; and
authenticating the user in accordance with a determination that the second computer-estimated pattern of motor-unit activations substantially matches the stored neuromuscular signature.

13. The method of claim 12, wherein:
the inference model is trained to output computer-estimated states of one or more motor units of the user; and
the second computer-estimated pattern of motor-unit activations comprises a computer-estimated recruitment pattern of the one or more motor units corresponding to the second neuromuscular signals.

14. The method of claim 13, wherein the computer-estimated recruitment pattern comprises a modulation of a computer-estimated firing rate of the one or more motor units.

15. The method of claim 13, wherein the computer-estimated recruitment pattern comprises a modulation to a first computer-estimated firing rate of a first portion of the one or more motor units that occurs while a second computer-estimated firing rate of a second portion of the one or more motor units is substantially unmodulated.

16. The method of claim 13, wherein the computer-estimated recruitment pattern comprises a computer-estimated motor-unit-action-potential waveform of the one or more motor units.

17. The method of claim 13, wherein the computer-estimated recruitment pattern comprises a timing of computer-estimated motor unit action potentials of the one or more motor units.

18. The method of claim 12, further comprising training the inference model to output computer-estimated states of a musculoskeletal representation of the user based on the one or more neuromuscular signals from the user, the musculoskeletal representation including rigid body segments connected by joints, each of the rigid body segments corresponding to one or more skeletal structures in the user's body.

19. The method of claim 18, wherein the second computer-estimated pattern of motor-unit activations is derived from a spatiotemporal pattern of computer-estimated positional relationships between the rigid body segments.

20. The method of claim 18, wherein the second computer-estimated pattern of motor-unit activations is derived from a spatiotemporal pattern of computer-estimated force relationships between the rigid body segments.

21. The method of claim 18, wherein the second computer-estimated pattern of motor-unit activations is derived from a computer-estimated recruitment pattern of motor units corresponding to the rigid body segments.

22. The method of claim 18, wherein identifying the second computer-estimated pattern of motor-unit activations comprises:
providing, as input to the inference model, the second neuromuscular signals and/or information based on the second neuromuscular signals;
providing, as a constraint used by the inference model, a prior state of the musculoskeletal representation, wherein the prior state of the musculoskeletal representation limits probabilities of possible subsequent states of the musculoskeletal representation;
receiving, as an output of the inference model, one or more additional states of the musculoskeletal representation corresponding to the second neuromuscular signals; and
deriving the second computer-estimated pattern of motor-unit activations from the one or more additional states.

23. The computerized system of claim 1, wherein the at least one computer processor is further programmed to generate, based on third neuromuscular signals obtained from the user while the user performs a third set of gestures, a control signal to control an operation of an augmented reality system or a virtual reality system.

24. The computerized system of claim 1, wherein authenticating the user comprises:
granting access to a secure system or location in response to a successful authentication of the user.

25. The computerized system of claim 24, wherein authenticating the user comprises:
determining whether the user continues to be successfully authenticated based, at least in part on, subsequent outputs of the inference model; and
revoking the access to the secure system or location in response to determining that the user does not continue to be successfully authenticated.

26. The computerized system of claim 1, wherein the first and second computer-estimated patterns of motor-unit activations comprise computer-estimated spatiotemporal activation patterns of a set of motor units of the user.

27. The method of claim 12, further comprising generating, based on third neuromuscular signals obtained from the user while the user performs a third set of gestures, a control signal to control an operation of an augmented reality system or a virtual reality system.

28. The method of claim 12, wherein authenticating the user comprises:
granting access to a secure system or location in response to a successful authentication of the user.

29. The method of claim 28, wherein authenticating the user comprises:
determining whether the user continues to be successfully authenticated based, at least in part on, subsequent outputs of the inference model; and
revoking the access to the secure system or location in response to determining that the user does not continue to be successfully authenticated.

30. The method of claim 12, wherein the first and second computer-estimated patterns of motor-unit activations comprise computer-estimated spatiotemporal activation patterns of a set of motor units.

\* \* \* \* \*